US012809278B2

(12) United States Patent
Sasaki et al.

(10) Patent No.: US 12,809,278 B2
(45) Date of Patent: Nov. 24, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Tomoya Sasaki, Kanagawa (JP); Ryosuke Fujii, Kanagawa (JP); Kohei Hashimoto, Kanagawa (JP); Hiroko Kobayashi, Kanagawa (JP); Yuto Okazaki, Kanagawa (JP); Kosuke Narita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 666 days.

(21) Appl. No.: 18/071,516

(22) Filed: Nov. 29, 2022

(65) Prior Publication Data

US 2023/0195003 A1 Jun. 22, 2023

(30) Foreign Application Priority Data

Dec. 16, 2021 (JP) ................................. 2021-204663
Sep. 8, 2022 (JP) ................................. 2022-143193

(51) Int. Cl.

| | |
|---|---|
| ***G03G 5/047*** | (2006.01) |
| ***C08G 63/193*** | (2006.01) |
| ***G03G 5/05*** | (2006.01) |

(52) U.S. Cl.

CPC ........... *G03G 5/047* (2013.01); *C08G 63/193* (2013.01); *G03G 5/056* (2013.01)

(58) Field of Classification Search

CPC ....... G03G 5/047; G03G 5/056; C08G 63/193
See application file for complete search history.

(56) References Cited

U.S. PATENT DOCUMENTS 10,031,430 B2 7/2018 Ogaki et al.
10,539,888 B2 1/2020 Kaku et al.
(Continued)

FOREIGN PATENT DOCUMENTS

JP 2001265021 9/2001
JP 2001265022 9/2001
(Continued)

OTHER PUBLICATIONS

"Office Action of Europe Counterpart Application", issued on Dec. 22, 2023, p. 1-p. 5.
(Continued)

*Primary Examiner* — Peter L Vajda
*Assistant Examiner* — Jenna Kuipers
(74) *Attorney, Agent, or Firm* — JCIPRNET

(57) ABSTRACT

An electrophotographic photoreceptor includes a conductive substrate, and a lamination type photosensitive layer disposed on the conductive substrate and including a charge generation layer and a charge transport layer, in which the charge transport layer contains a charge transport material and a polyester resin, and a mass proportion of a chemical substance (AA) represented by Formula (AA) in a total mass of the charge transport layer is 2,000 ppm or less.

Formula (AA)

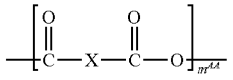

In Formula (AA), X represents an organic group, and $m^{AA}$ represents an integer.

16 Claims, 4 Drawing Sheets

(56) References Cited

U.S. PATENT DOCUMENTS

| | | | |
|---|---|---|---|
| 10,884,348 B2 | 1/2021 | Yoshizawa | |
| 11,106,147 B2 | 8/2021 | Kudoh | |
| 12,288,951 B2 | 4/2025 | Brockschmidt, Jr. et al. | |
| 2020/0231535 A1* | 7/2020 | Azuma | G03G 5/0618 |
| 2020/0233322 A1 | 7/2020 | Choda et al. | |
| 2021/0286277 A1 | 9/2021 | Shimizu | |

FOREIGN PATENT DOCUMENTS

| | | |
|---|---|---|
| JP | 2004085644 | 3/2004 |
| JP | 2006330713 | 12/2006 |
| JP | 2008033140 | 2/2008 |
| JP | 2013097300 | 5/2013 |
| JP | 2016133795 | 7/2016 |
| JP | 2016200723 | 12/2016 |
| JP | 2016200723 A * | 12/2016 |
| JP | 2017146548 | 8/2017 |
| JP | 2018159087 | 10/2018 |
| JP | 2019012141 | 1/2019 |
| JP | 2019035900 | 3/2019 |
| JP | 6500996 | 4/2019 |
| JP | 6664234 | 3/2020 |
| JP | 2021015223 | 2/2021 |
| JP | 2021071565 | 5/2021 |
| JP | 2021117377 | 8/2021 |
| JP | 2021148818 | 9/2021 |
| JP | 2021194546 | 12/2021 |
| WO | 2017073176 | 5/2017 |
| WO | 2018056326 | 3/2018 |
| WO | 2019070003 | 4/2019 |

OTHER PUBLICATIONS

"Office Action of Europe Counterpart Application", issued on Aug. 16, 2024, p. 1-p. 3.

"Search Report of Europe Counterpart Application", issued on Apr. 28, 2023, p. 1-p. 6.

"Office Action of Europe Counterpart Application", issued on Apr. 30, 2024, p. 1-p. 6.

"Notice of Reasons for Refusal of Japan Counterpart Application No. 2022-143193", issued on Sep. 1, 2026, with English translation thereof, p. 1-p. 8.

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-204663 filed Dec. 16, 2021 and Japanese Patent Application No. 2022-143193 filed Sep. 8, 2022.

BACKGROUND

(i) Technical Field

The present invention relates to an electrophotographic photoreceptor, a process cartridge, and an image forming apparatus.

(ii) Related Art

JP2001-265021A discloses an electrophotographic photoreceptor including a photosensitive layer that contains a polyester resin having a biphenyl structure as a repeating unit.

JP2001-265022A discloses an electrophotographic photoreceptor including a photosensitive layer that contains a polyester resin having a biphenyl structure and a bisphenol structure as repeating units.

JP2016-133795A discloses an electrophotographic photoreceptor including a photosensitive layer that contains a polyester resin having, for example, a diphenyl ether-4,4'-dicarboxylic acid unit, for example, a 4,4'-diphenyldicarboxylic acid unit, and for example, a 2,2-bis(4-hydroxy-3-methylphenyl)propane unit as repeating structures.

WO2017/073176A discloses an electrophotographic photoreceptor including a photosensitive layer that contains a polyarylate resin having a 4,4'-diphenyldicarboxylic acid unit and a 2,2-bis(4-hydroxyphenyl)butane unit as repeating structures.

JP2017-146548A discloses—an electrophotographic photoreceptor including a surface layer that contains a polyester resin having a 2,6-naphthalenedicarboxylic acid unit, a diphenyl ether-4,4'-dicarboxylic acid unit, and a bisphenol unit as constitutional units.

SUMMARY

Aspects of non-limiting embodiments of the present disclosure relate to an electrophotographic photoreceptor in which burn-in ghosts are unlikely to occur as compared with an electrophotographic photoreceptor including a lamination type photosensitive layer, in which the mass proportion of a chemical substance (AA) in the total mass of a charge transport layer is greater than 2,000 ppm or an electrophotographic photoreceptor including a single layer type photosensitive layer, in which the mass proportion of a chemical substance (AA) in the total mass of the single layer type photosensitive layer is greater than 2,000 ppm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspects.

According to an aspect of the present disclosure, there is provided an electrophotographic photoreceptor including a conductive substrate, and a lamination type photosensitive layer disposed on the conductive substrate and including a charge generation layer and a charge transport layer, in which the charge transport layer contains a charge transport material and a polyester resin, and a mass proportion of a chemical substance (AA) represented by Formula (AA) in a total mass of the charge transport layer is 2,000 ppm or less.

BRIEF DESCRIPTION OF THE DRAWINGS

Exemplary embodiment(s) of the present invention will be described in detail based on the following figures, wherein.

DETAILED DESCRIPTION

Figure 1:
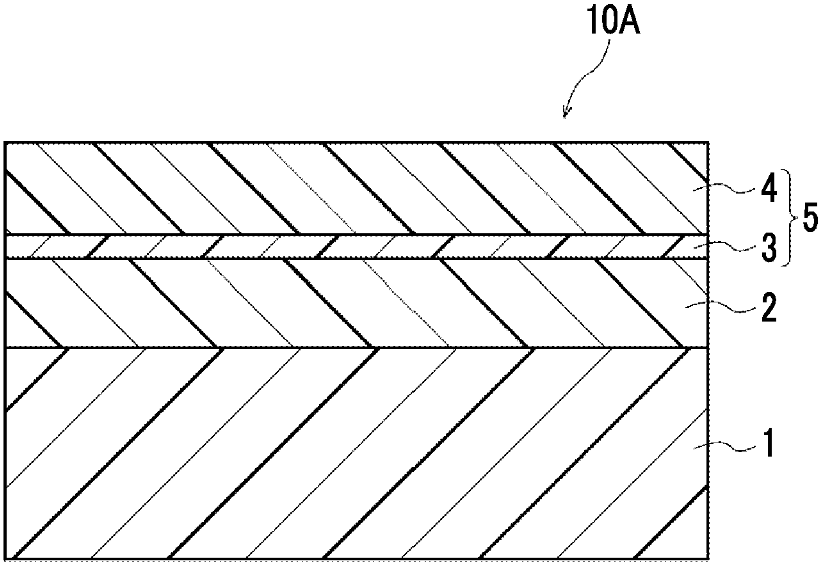
FIG. 1 is a partial cross-sectional view showing an example of a layer configuration of an electrophotographic photoreceptor according to a first exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in Examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, an alkyl group may be any of linear, branched, or cyclic unless otherwise specified.

In the present disclosure, a hydrogen atom in an organic group, an aromatic ring, a linking group, an alkyl group, an aryl group, an aralkyl group, an alkoxy group, or an aryloxy group may be substituted with a halogen atom.

In the present disclosure, ppm stands for parts per million and is on a mass basis.

Electrophotographic Photoreceptor

The present disclosure provides a first exemplary embodiment and a second exemplary embodiment of an electrophotographic photoreceptor (hereinafter, also referred to as a "photoreceptor").

The photoreceptor according to the first exemplary embodiment includes a conductive substrate, and a lamination type photosensitive layer disposed on the conductive substrate and including a charge generation layer and a charge transport layer. The photoreceptor according to the first exemplary embodiment may further include other layers (for example, an undercoat layer and an interlayer).

The photoreceptor according to the second exemplary embodiment includes a conductive substrate, and a single layer type photosensitive layer disposed on the conductive substrate. The photoreceptor according to the second exemplary embodiment may further include other layers (for example, an undercoat layer and an interlayer).

FIG. 1 is a partial cross-sectional view schematically showing an example of the layer configuration of the photoreceptor according to the first exemplary embodiment. A photoreceptor 10A shown in FIG. 1 includes a lamination type photosensitive layer. The photoreceptor 10A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). The photoreceptor 10A may include an interlayer (not shown) between the undercoat layer 2 and the charge generation layer 3.

Figure 2:
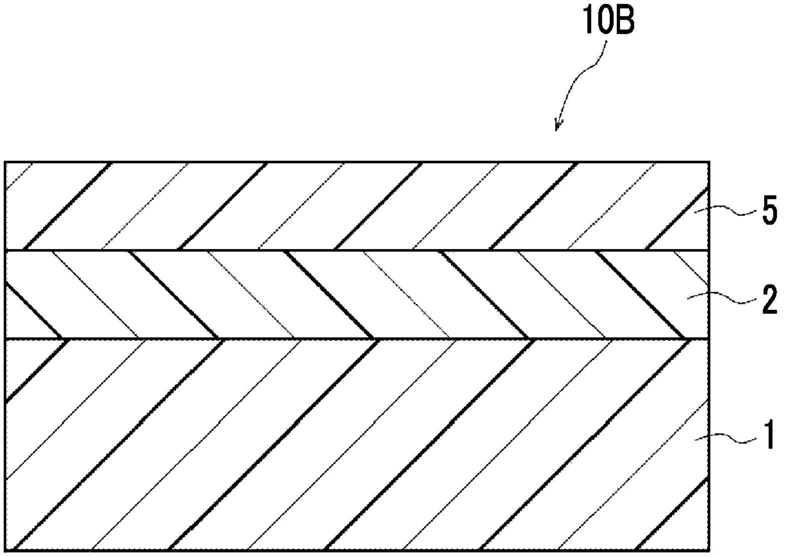
FIG. 2 is a partial cross-sectional view showing an example of a layer configuration of an electrophotographic photoreceptor according to a second exemplary embodiment.

FIG. 2 is a partial cross-sectional view schematically showing an example of the layer configuration of the photoreceptor according to the second exemplary embodiment. A photoreceptor 10B shown in FIG. 2 includes a single layer type photosensitive layer. The photoreceptor 10B has a structure in which the undercoat layer 2 and the photosensitive layer 5 are laminated in this order on the conductive substrate 1. The photoreceptor 10B may include an interlayer (not shown) between the undercoat layer 2 and the photosensitive layer 5.

In the photoreceptor according to the first exemplary embodiment, the charge transport layer contains a charge transport material and a polyester resin, and the mass proportion of a chemical substance (AA) represented by Formula (AA) in the total mass of the charge transport layer is 2,000 ppm or less.

In the photoreceptor according to the second exemplary embodiment, the single layer type photosensitive layer contains a charge transport material and a polyester resin, and the mass proportion of a chemical substance (AA) represented by Formula (AA) in the total mass of the single layer type photosensitive layer is 2,000 ppm or less.

Formula (AA)

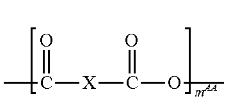

In Formula (AA), X represents an organic group, and n represents an integer.

The chemical substance (AA) contains a low-molecular-weight compound and an oligomer consisting of a constitutional unit $-C(=O)-X-C(=O)-O-$. The mass of the chemical substance (AA) contained in the charge transport layer or single layer type photosensitive layer is the mass quantified by decomposing the chemical substance (AA) into a dicarboxylic acid and a dicarboxylic acid derivative. The details will be described below.

Hereinafter, in a case of description common to the first exemplary embodiment and the second exemplary embodiment, both exemplary embodiments are collectively referred to as the present exemplary embodiment.

The present inventors found that occurrence of burn-in ghosts can be suppressed by setting the mass proportion of the chemical substance (AA) in the total mass of the charge transport layer or the single layer type photosensitive layer to 2,000 ppm or less. The burn-in ghosts are image defects in which the surface potential of a portion of a photoreceptor with a large exposure history decreases and thus the density of a halftone image increases.

The relationship between the chemical substance (AA) and the burn-in ghosts is assumed as follows.

The chemical substance (AA) is generated as a by-product during synthesis of a polyester resin. Therefore, the photosensitive layer containing a polyester resin as a binder resin contains the chemical substance (AA) brought in by the polyester resin.

The chemical substance (AA) is an electron-accepting chemical substance and is likely to interact with an electron-donating charge transport material. The interaction between the chemical substance and the charge transport material results in a change in energy level of the charge transport material, and as a result, the charge is gradually accumulated on the exposed portion of the photosensitive layer each time the photoreceptor is exposed. In a case where the charge accumulated in the portion with a large exposure history is released at once in a case where the photoreceptor is charged, the surface potential of the portion with a large exposure history is decreased more than the periphery of the portion, and thus burn-in ghosts appear in the halftone image.

Further, repeated image formation worsens the degree of burn-in ghosts. While the spatial arrangement and the relative arrangement of the components in the photosensitive layer are gradually changed as the image formation is repeated, the interaction between the chemical substance (AA) and the charge transport material gradually increases. As a result, repeated image formation results in an increase in a surface potential difference between a portion with a large exposure history and a portion with a small exposure history, and thus the degree of burn-in ghosts worsens.

In the photoreceptor according to the first exemplary embodiment, from the viewpoint of suppressing occurrence of burn-in ghosts, the mass proportion of the chemical substance (AA) in the total mass of the charge transport layer is 2,000 ppm or less, for example, preferably 500 ppm or less, more preferably 200 ppm or less, and still more preferably 100 ppm or less, and it is preferable that the mass proportion thereof is as low as possible and is ideally 0 ppm.

On the other hand, from the viewpoint of suppressing a change in the electrical properties of the charge transport layer due to moisture absorption, the mass proportion of the chemical substance (AA) in the total mass of the charge transport layer is, for example, preferably 1 ppm or greater, more preferably 5 ppm or greater, and still more preferably 10 ppm or greater.

In the photoreceptor according to the second exemplary embodiment, from the viewpoint of suppressing occurrence of burn-in ghosts, the mass proportion of the chemical substance (AA) in the total mass of the single layer type photosensitive layer is 2,000 ppm or less, for example, preferably 500 ppm or less, more preferably 200 ppm or less, and still more preferably 100 ppm or less, and it is preferable that the mass proportion thereof is as low as possible and is ideally 0 ppm.

On the other hand, from the viewpoint of suppressing a change in the electrical properties of the single layer type photosensitive layer due to moisture absorption, the mass proportion of the chemical substance (AA) in the total mass of the single layer type photosensitive layer is, for example, preferably 1 ppm or greater, more preferably 5 ppm or greater, and still more preferably 10 ppm or greater.

Examples of a method of decreasing the content of the chemical substance (AA) contained in the charge transport layer or the single layer type photosensitive layer include the following methods for the polyester resin used as a binder resin of the charge transport layer or the single layer type photosensitive layer.

In a case of polymerization of the polyester resin, a method of increasing the purity of the monomer serving as a raw material, a method of sufficiently dissolving the monomer and initiating the polymerization reaction, a method of setting the concentration of the dicarboxylic acid (specifically, dicarboxylic acid chloride) in the polymerization reaction system to be low, or the like may be employed.

After the polymerization of the polyester resin, a method of reprecipitating the polyester resin in a solvent (such as alcohol) that is a poor solvent for the polyester resin and a good solvent for the chemical substance (AA), a method of performing an amine treatment on the polyester resin, or the like is employed. The amine treatment is a treatment of adding an amine compound to the polyester resin to decompose the chemical substance (AA). The chemical substance (AA) is decomposed by the amine treatment so that the content of the chemical substance (AA) can be decreased. As the amine compound, for example, a primary amine compound or a secondary amine compound is preferable from the viewpoint of easily reacting with the chemical substance (AA), and for example, a secondary amine compound is more preferable from the viewpoint of suppressing the side reaction with the polyester resin. From the viewpoint of removability of the secondary amine compound and the decomposition product of the chemical substance (AA), for example, the molecular weight of the amine compound is preferably small, and for example, diethylamine is more preferable as the amine compound.

As a method of adjusting the content of the chemical substance (AA) contained in the charge transport layer or the single layer type photosensitive layer in a case of production of the photoreceptor, the chemical substance (AA) may also be separately added to the charge transport layer or the single layer type photosensitive layer.

In the present exemplary embodiment, the mass of the chemical substance (AA) contained in the charge transport layer or single layer type photosensitive layer is the mass quantified by decomposing the chemical substance (AA) into a dicarboxylic acid and a dicarboxylic acid derivative. The details of the measuring method are as follows. That is, the chemical substance (AA) is a chemical substance quantified by the scheme described below.

The following description is for the first exemplary embodiment. The description for the second exemplary embodiment is made in the same manner as described above except for replacing "charge transport layer" with "single layer type photosensitive layer".

0. Extraction of Charge Transport Layer

The photoreceptor is immersed in various solvents (mixed solvents may be used), and the solvent in which the charge transport layer is dissolved is grasped. The photoreceptor is immersed in a solvent in which the charge transport layer is dissolved to extract the charge transport layer. A mixture of the components constituting the charge transport layer is obtained by removing the solvent from the solution from which the charge transport layer is extracted (for example, vacuum drying is performed after concentration of the solution). Hereinafter, this mixture will be referred to as a sample (0). The sample (0) is weighed and set as the mass of the charge transport layer.

1. Preparation of Measurement Sample 1-1. Preparation of Measurement Sample without Amine Treatment A predetermined amount of the sample (0) is dissolved in a predetermined amount of a good solvent such as tetrahydrofuran, a predetermined amount of a poor solvent such as methanol is added thereto to obtain a constant volume, and the polymer is reprecipitated. The supernatant after the reprecipitation of the polymer is filtered through a filter, and the filtrate is used as a measurement sample.

1-2. Preparation of Measurement Sample with Amine Treatment

A predetermined amount of the sample (0) is dissolved in a predetermined amount of a good solvent such as tetrahydrofuran, a predetermined amount of diethylamine is added thereto, and a base treatment is performed. Next, a predetermined amount of a poor solvent such as methanol is added thereto to obtain a constant volume, and the polymer is reprecipitated. The supernatant after the reprecipitation of the polymer is filtered through a filter, and the filtrate is used as a measurement sample.

In a case where the sample (0) contains the chemical substance (AA), a dicarboxylic acid and a dicarboxylic acid derivative represented by Formula (AB) are generated by the above-described treatments.

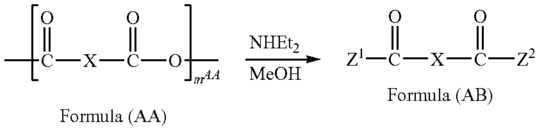

Formula (AA) Formula (AB)

In Formula (AB), X represents an organic group and has the same definition as that for X in Formula (AA). $Z^1$ and $Z^2$ each independently represent —OH or —$NEt_2$. Et represents an ethyl group, and Me represents a methyl group.

Specifically, the following chemical substances are generated as a dicarboxylic acid and a dicarboxylic acid derivative represented by Formula (AB).

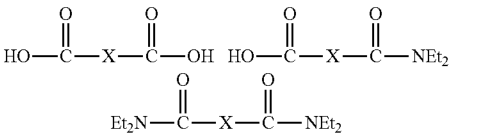

2. Analysis by High Performance Liquid Chromatography (HPLC)

For example, HPLC measurement is performed by using an ODS column as a separation column for analysis, water containing phosphoric acid and acetonitrile as an eluent, and a photodiode array detector (example of the detection wavelength: 254 nm) as a detection device.

3. Quantification of Chemical Substance (AA)

A calibration curve showing the relationship between the area of peaks derived from the dicarboxylic acid and the dicarboxylic acid derivative represented by Formula (AB) and the mass of the compound is created in advance.

In the chromatogram of the measurement sample without the amine treatment, the mass of each compound is acquired from the area values of the dicarboxylic acid and the dicarboxylic acid derivative represented by Formula (AB) and the above-described calibration curve, and the mass proportion of the dicarboxylic acid and the dicarboxylic acid derivative represented by Formula (AB) in the mass of the charge transport layer is calculated by considering the sample injection amount according to HPLC. The calculated value is defined as "measured value 1".

In the chromatogram of the measurement sample with the amine treatment, the mass proportion of the dicarboxylic acid and the dicarboxylic acid derivative represented by Formula (AB) in the mass of the charge transport layer is calculated in the same manner as described above. The calculated value is defined as "measured value 2".

A difference between the measured value 2 and the measured value 1 (measured value 2−measured value 1) is defined as the mass proportion (ppm) of the chemical substance (AA) in the mass of the charge transport layer.

Hereinafter, the polyester resin (1), the chemical substance (AA), and each layer of the photoreceptor will be described in detail.

Polyester Resin (1)

The polyester resin (1) has at least a dicarboxylic acid unit (A) and a diol unit (B). The polyester resin (1) may have other dicarboxylic acid units in addition to the dicarboxylic acid unit (A). The polyester resin (1) may have other diol units in addition to the diol unit (B).

The dicarboxylic acid unit (A) is a constitutional unit represented by Formula (A).

Formula (A)

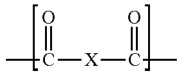

In Formula (A), X represents an organic group.

Examples of the organic group as X include an alkyl group, an aryl group, an aralkyl group, an alkoxy group, an aryloxy group, an ether group, a thioether group, and a combination of these groups.

Examples of the exemplary embodiment of the dicarboxylic acid unit (A) include a dicarboxylic acid unit (A') represented by Formula (A').

Formula (A')

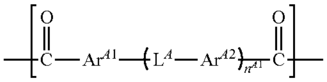

In Formula (A'), $Ar^{A1}$ and $Ar^{A2}$ each independently represent an aromatic ring that may have a substituent, $L^A$ represents a single bond or a divalent linking group, and $n^{A1}$ represents 0, 1, or 2.

The aromatic ring as $Ar^{A1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A1}$ may be substituted with an alkyl group, an aryl group, an aralkyl group, an alkoxy group, an aryloxy group, a halogen atom, or the like. As the substituent in a case where the aromatic ring as $Ar^{A1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring of $Ar^{A2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A2}$ may be substituted with an alkyl group, an aryl group, an aralkyl group, an alkoxy group, an aryloxy group, a halogen atom, or the like. As the substituent in a case where the aromatic ring as $Ar^{A2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

In a case where $L^A$ represents a divalent linking group, examples of the divalent linking group include an oxygen atom, a sulfur atom, and —$C(Ra^1)(Ra^2)$-. Here, $Ra^1$ and $Ra^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^1$ and $Ra^2$ may be bonded to each other to form a cyclic alkyl group.

The alkyl group having 1 or more and 10 or less carbon atoms as $Ra^1$ and $Ra^2$ may be any of linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Ra^1$ and $Ra^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ra^1$ and $Ra^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Ra^1$ and $Ra^2$ may be any of a monocycle or a polycycle. The number of carbon atoms of the aryl group is, for example, preferably 6 or more and 10 or less and more preferably 6.

It is preferable that the dicarboxylic acid unit (A) includes, for example, at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4).

The dicarboxylic acid unit (A) includes, for example, more preferably at least one selected from the group consisting of a dicarboxylic acid unit (A2), a dicarboxylic acid unit (A3), and a dicarboxylic acid unit (A4) and still more preferably a dicarboxylic acid unit (A2).

Formula (A1)

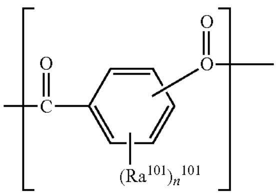

In Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{101}$ represents, for example, preferably 0, 1, or 2, more preferably 0 or 1, and still more preferably 0.

Formula (A2)

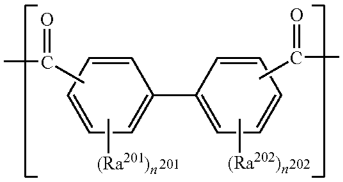

In Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{201}$ represents, for example, preferably 0, 1, or 2, more preferably 0 or 1, and still more preferably 0.

$n^{202}$ represents, for example, preferably 0, 1, or 2, more preferably 0 or 1, and still more preferably 0.

Formula (A3)

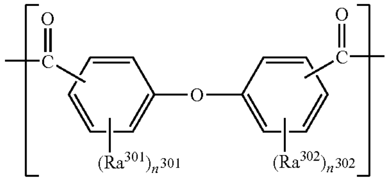

In Formula (A3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{301}$ represents, for example, preferably 0, 1, or 2, more preferably 0 or 1, and still more preferably 0.

$n^{302}$ represents, for example, preferably 0, 1, or 2, more preferably 0 or 1, and still more preferably 0.

Formula (A4)

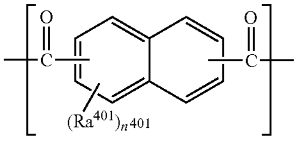

In Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{401}$ represents, for example, preferably an integer of 0 or greater and 4 or less, more preferably 0, 1, or 2, and still more preferably 0.

The specific forms and the preferable forms of $Ra^{101}$ in Formula (A1), $Ra^{201}$ and $Ra^{202}$ in Formula (A2), $Ra^{301}$ and $Ra^{302}$ in Formula (A3), and $Ra^{401}$ in Formula (A4) are the same as each other, and hereinafter, $Ra^{101}$, $Ra^{201}$, $Ra^{202}$, $Ra^{301}$, $Ra^{302}$, and $Ra^{401}$ will be collectively referred to as "Ra".

The alkyl group having 1 or more and 10 or less carbon atoms as Ra may be any of linear, branched, or cyclic. The number of carbon atoms of the alkyl group is, for example, preferably 1 or more and 6 or less, more preferably 1 or more and 4 or less, and still more preferably 1 or 2.

Examples of the linear alkyl group having 1 or more and 10 or less carbon atoms include a methyl group, an ethyl group, an n-propyl group, an n-butyl group, an n-pentyl group, an n-hexyl group, an n-heptyl group, an n-octyl group, an n-nonyl group, and an n-decyl group.

Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic)alkyl groups to which these monocyclic alkyl groups are linked.

The aryl group having 6 or more and 12 or less carbon atoms as Ra may be any of a monocycle or a polycycle. The number of carbon atoms of the aryl group is, for example, preferably 6 or more and 10 or less and more preferably 6.

Examples of the aryl group having 6 or more and 12 or less carbon atoms include a phenyl group, a biphenyl group, a 1-naphthyl group, and a 2-naphthyl group.

The alkyl group in the alkoxy group having 1 or more and 6 or less carbon atoms as Ra may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Hereinafter, dicarboxylic acid units (A1-1) to (A1-9) are shown as specific examples of the dicarboxylic acid unit (A1). The dicarboxylic acid unit (A1) is not limited thereto.

(A1-1)

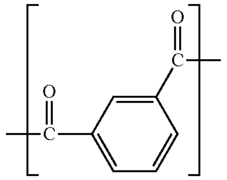

(A1-2)

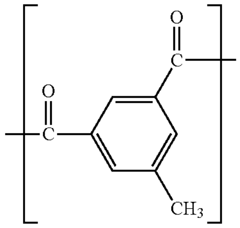

(A1-3)

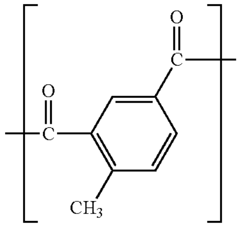

-continued (A1-4)

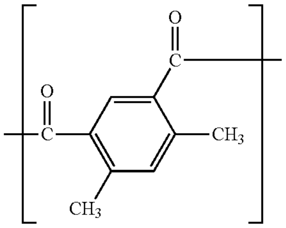

(A1-5)

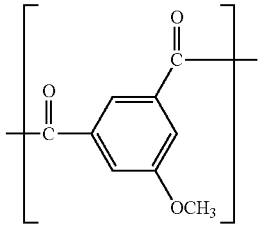

(A1-6)

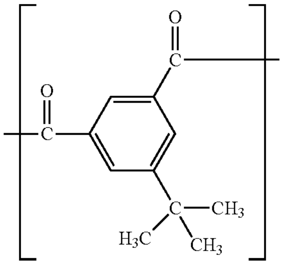

(A1-7)

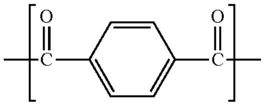

(A1-8)

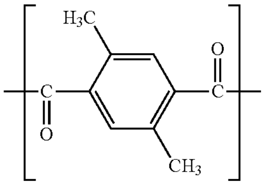

(A1-9)

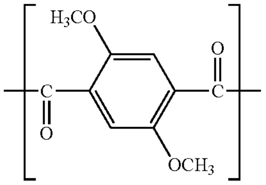

Hereinafter, dicarboxylic acid units (A2-l) to (A2-3) are shown as specific examples of the dicarboxylic acid unit (A2). The dicarboxylic acid unit (A2) is not limited thereto.

(A2-1)

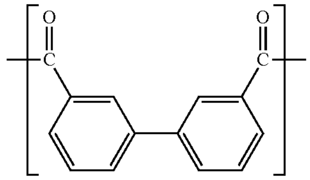

-continued (A2-2)

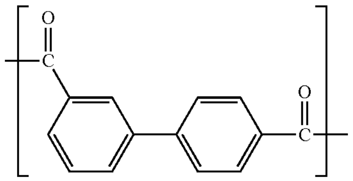

(A2-3)

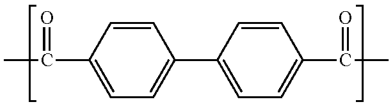

Hereinafter, dicarboxylic acid units (A3-1) and (A3-2) are shown as specific examples of the dicarboxylic acid unit (A3). The dicarboxylic acid unit (A3) is not limited thereto.

(A3-1)

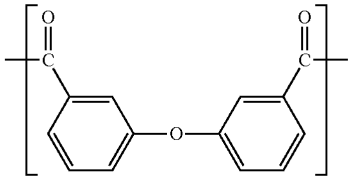

(A3-2)

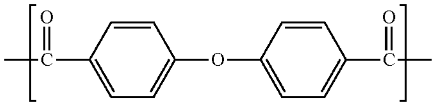

Hereinafter, dicarboxylic acid units (A4-1) to (A4-3) are shown as specific examples of the dicarboxylic acid unit (A4). The dicarboxylic acid unit (A4) is not limited thereto.

(A4-1)

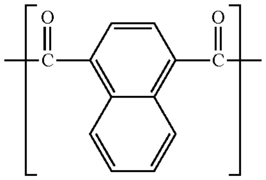

(A4-2)

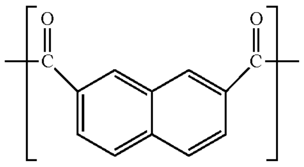

(A4-3)

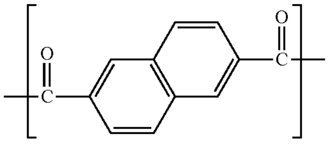

The polyester resin (1) has, for example, preferably at least one selected from the group consisting of (A1-1), (A1-7), (A2-3), (A3-2), and (A4-3), more preferably at least one selected from the group consisting of (A2-3), (A3-2), and (A4-3), and still more preferably at least (A2-3) as the dicarboxylic acid unit (A).

The total mass proportion of the dicarboxylic acid units (A1) to (A4) in the polyester resin (1) is, for example, preferably 15% by mass or greater and 60% by mass or less.

In a case where the total mass proportion of the dicarboxylic acid units (A1) to (A4) is 15% by mass or greater, the abrasion resistance of the photosensitive layer is enhanced. From this viewpoint, the total mass proportion of the dicarboxylic acid units (A1) to (A4) is, for example, more preferably 20% by mass or greater and still more preferably 25% by mass or greater.

In a case where the total mass proportion of the dicarboxylic acid units (A1) to (A4) is 60% by mass or less, peeling of the photosensitive layer can be suppressed. From this viewpoint, the total mass proportion of the dicarboxylic acid units (A1) to (A4) is, for example, more preferably 55% by mass or less and still more preferably 50% by mass or less.

The dicarboxylic acid units (A1) to (A4) contained in the polyester resin (1) may be used alone or in combination of two or more kinds thereof.

Examples of other dicarboxylic acid units (A) in addition to the dicarboxylic acid units (A1) to (A4) include aliphatic dicarboxylic acid (such as oxalic acid, malonic acid, maleic acid, fumaric acid, citraconic acid, itaconic acid, glutaconic acid, succinic acid, alkenyl succinic acid, adipic acid, and sebacic acid) units, alicyclic dicarboxylic acid (such as cyclohexanedicarboxylic acid) units, and lower (for example, having 1 or more and 5 or less carbon atoms) alkyl ester units thereof. These dicarboxylic acid units contained in the polyester resin (1) may be used alone or in combination of two or more kinds thereof.

The dicarboxylic acid unit (A) contained in the polyester resin (1) may be used alone or in combination of two or more kinds thereof.

The diol unit (B) is a constitutional unit represented by Formula (B).

Formula (B)

$$-\!\!\left[ O - Ar^{B1} - \left( L^{B} - Ar^{B2} \right)_{n^{B1}} - O \right]\!\!-$$

In Formula (B), $ArB^1$ and $ArB^2$ each independently represent an aromatic ring that may have a substituent, $L^B$ represents a single bond, an oxygen atom, a sulfur atom, or $-C(Rb^1)(Rb^2)-$, and $n^{B1}$ represents 0, 1, or 2. $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

The aromatic ring as $Ar^{B1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B1}$ may be substituted with an alkyl group, an aryl group, an aralkyl group, an alkoxy group, an aryloxy group, a halogen atom, or the like. As the substituent in a case where the aromatic ring as $Ar^{B1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring as $Ar^{B2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B2}$ may be substituted with an alkyl group, an aryl group, an aralkyl group, an alkoxy group, an aryloxy group, a halogen atom, or the like. As the substituent in a case where the aromatic ring as $Ar^{B2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The alkyl group having 1 or more and 20 or less carbon atoms as $Rb^1$ and $Rb^2$ may be linear, branched, or cyclic. The number of carbon atoms of the alkyl group is, for example, preferably 1 or more and 18 or less, more preferably 1 or more and 14 or less, and still more preferably 1 or more and 10 or less.

The aryl group having 6 or more and 12 or less carbon atoms as $Rb^1$ and $Rb^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rb^1$ and $Rb^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rb^1$ and $Rb^2$ may be any of a monocycle or a polycycle. The number of carbon atoms of the aryl group is, for example, preferably 6 or more and 10 or less and more preferably 6.

It is preferable that the diol unit (B) includes, for example, at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

The diol unit (B) includes, for example, more preferably at least one selected from the group consisting of a diol unit (B1), a diol unit (B2), a diol unit (B4), a diol unit (B5), and a diol unit (B6), still more preferably at least one selected from the group consisting of a diol unit (B1), a diol unit (B2), a diol unit (B5), and a diol unit (B6), even still more preferably at least one selected from the group consisting of a diol unit (B1), a diol unit (B2), and a diol unit (B6), and most preferably at least one selected from the group consisting of a diol unit (B1) and a diol unit (B2).

Formula (B1)

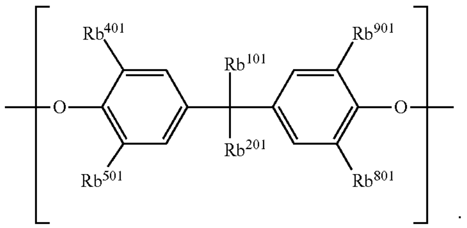

In Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

The number of carbon atoms of the branched alkyl group having 4 or more and 20 or less carbon atoms as $Rb^{101}$ is, for example, preferably 4 or more and 16 or less, more preferably 4 or more and 12 or less, and still more preferably 4 or more and 8 or less. Specific examples of $Rb^{101}$ include an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Formula (B2)

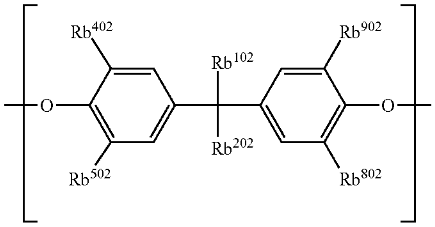

In Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 4 or more and 20 or less carbon atoms as $Rb^{102}$ is, for example, preferably 4 or more and 16 or less, more preferably 4 or more and 12 or less, and still more preferably 4 or more and 8 or less. Specific examples of $Rb^{102}$ include an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Formula (B3)

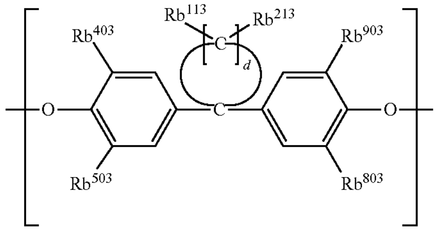

In Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{113}$ and $Rb^{213}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{113}$ and $Rb^{213}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{113}$ and $Rb^{213}$ include a fluorine atom, a chlorine atom, a bromine atom, and an iodine atom.

Formula (B4)

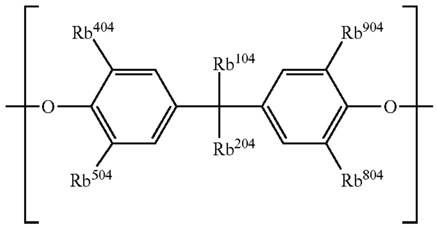

In Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

The alkyl group having 1 or more and 3 or less carbon atoms as $Rb^{104}$ may be any of linear, branched, or cyclic. The number of carbon atoms of the alkyl group is, for example, preferably 1 or 2 and more preferably 1. Specific examples of $Rb^{104}$ include a methyl group, an ethyl group, an n-propyl group, an isopropyl group, and a cyclopropyl group.

Formula (B5)

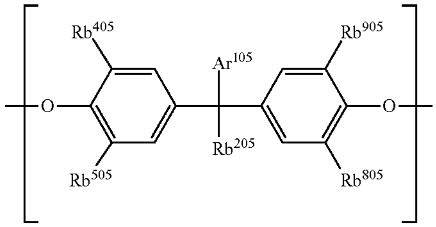

In Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

The aryl group having 6 or more and 12 or less carbon atoms as $Ar^{105}$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ar^{105}$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2. The aryl group in the aralkyl group having 7 or more and 20 or less carbon atoms as $Ar^{105}$ may be any of a monocycle or a polycycle. The number of carbon atoms of the aryl group is, for example, preferably 6 or more and 10 or less and more preferably 6. Examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

Formula (B6)

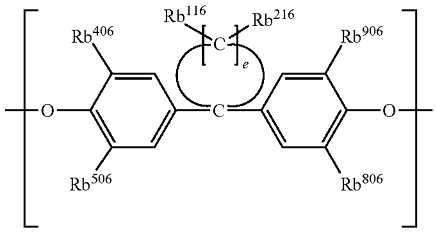

In Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{116}$ and $Rb^{216}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{116}$ and $Rb^{216}$ may be linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{116}$ and $Rb^{216}$ include a fluorine atom, a chlorine atom, a bromine atom, and an iodine atom.

Formula (B7)

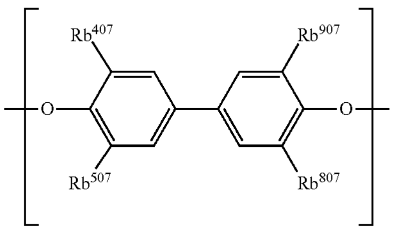

In Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

Formula (B8)

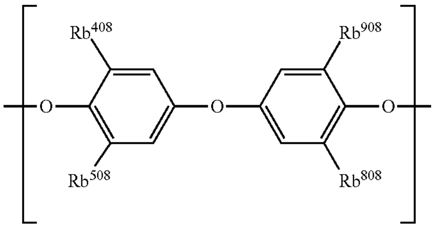

In Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

The specific forms and the preferable forms of $Rb^{201}$ in Formula (B1), $Rb^{202}$ in Formula (B2), $Rb^{204}$ in Formula (B4), and $Rb^{205}$ in Formula (B5) are the same as each other, and hereinafter, $Rb^{201}$, $Rb^{202}$, $Rb^{204}$, and $Rb^{205}$ will be collectively referred to as "$Rb^{200}$".

The alkyl group having 1 or more and 3 or less carbon atoms as $Rb^{200}$ may be any of linear, branched, or cyclic. The number of carbon atoms of the alkyl group is, for example, preferably 1 or 2 and more preferably 1.

The alkyl group having 1 or more and 3 or less carbon atoms includes a methyl group, an ethyl group, an n-propyl group, an isopropyl group, and a cyclopropyl group.

The specific forms and the preferable forms of $Rb^{401}$ in Formula (B1), $Rb^{402}$ in Formula (B2), $Rb^{403}$ in Formula (B3), $Rb^{404}$ in Formula (B4), $Rb^{405}$ in Formula (B5), $Rb^{406}$ in Formula (B6), $Rb^{407}$ in Formula (B7), and $Rb^{408}$ in Formula (B8) are the same as each other, and hereinafter, $Rb^{401}$, $Rb^{402}$, $Rb^{403}$, $Rb^{404}$, $Rb^{405}$, $Rb^{406}$, $Rb^{407}$, and $Rb^{408}$ will be collectively referred to as "$Rb^{400}$".

The alkyl group having 1 or more and 4 or less carbon atoms as $Rb^{400}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{400}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{400}$ include a fluorine atom, a chlorine atom, a bromine atom, and an iodine atom.

The specific forms and the preferable forms of $Rb^{501}$ in Formula (B1), $Rb^{502}$ in Formula (B2), $Rb^{503}$ in Formula (B3), $Rb^{504}$ in Formula (B4), $Rb^{505}$ in Formula (B5), $Rb^{506}$ in Formula (B6), $Rb^{507}$ in Formula (B7), and $Rb^{508}$ in Formula (B8) are the same as each other, and hereinafter, $Rb^{501}$, $Rb^{502}$, $Rb^{503}$, $Rb^{504}$, $Rb^{505}$, $Rb^{506}$, $Rb^{507}$, and $Rb^{508}$ will be collectively referred to as "$Rb^{500}$".

The alkyl group having 1 or more and 4 or less carbon atoms as $Rb^{500}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{500}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{500}$ include a fluorine atom, a chlorine atom, a bromine atom, and an iodine atom.

The specific forms and the preferable forms of $Rb^{801}$ in Formula (B1), $Rb^{802}$ in Formula (B2), $Rb^{803}$ in Formula (B3), $Rb^{804}$ in Formula (B4), $Rb^{805}$ in Formula (B5), $Rb^{806}$ in Formula (B6), $Rb^{807}$ in Formula (B7), and $Rb^{808}$ in Formula (B8) are the same as each other, and hereinafter, $Rb^{801}$, $Rb^{802}$, $Rb^{803}$, $Rb^{804}$, $Rb^{805}$, $Rb^{806}$, $Rb^{807}$, and $Rb^{808}$ will be collectively referred to as "$Rb^{800}$".

The alkyl group having 1 or more and 4 or less carbon atoms as $Rb^{800}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{800}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{800}$ include a fluorine atom, a chlorine atom, a bromine atom, and an iodine atom.

The specific forms and the preferable forms of $Rb^{901}$ in Formula (B1), $Rb^{902}$ in Formula (B2), $Rb^{903}$ in Formula (B3), $Rb^{904}$ in Formula (B4), $Rb^{905}$ in Formula (B5), $Rb^{906}$ in Formula (B6), $Rb^{907}$ in Formula (B7), and $Rb^{908}$ in Formula (B8) are the same as each other, and hereinafter, $Rb^{901}$, $Rb^{902}$, $Rb^{903}$, $Rb^{904}$, $Rb^{905}$, $Rb^{906}$, $Rb^{907}$, and $Rb^{908}$ will be collectively referred to as "$Rb^{900}$".

The alkyl group having 1 or more and 4 or less carbon atoms as $Rb^{900}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms includes a cyclopropyl group and a cyclobutyl group.

The alkyl group in the alkoxy group having 1 or more and 6 or less carbon atoms as $Rb^{900}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{900}$ include a fluorine atom, a chlorine atom, a bromine atom, and an iodine atom.

Hereinafter, diol units (B1-1) to (B1-6) are shown as specific examples of the diol unit (B1). The diol unit (B1) is not limited thereto.

(B1-1)

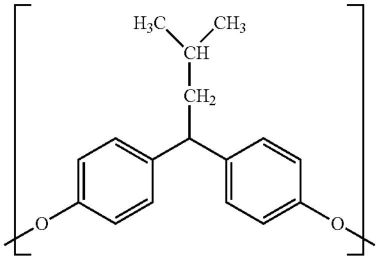

(B1-2)

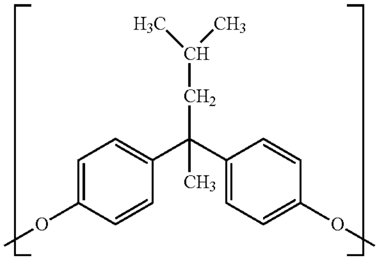

-continued
(B1-3)
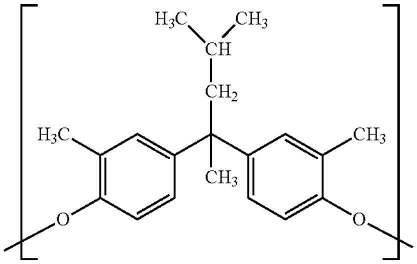
(B1-4)
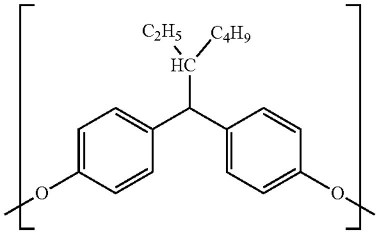
(B1-5)
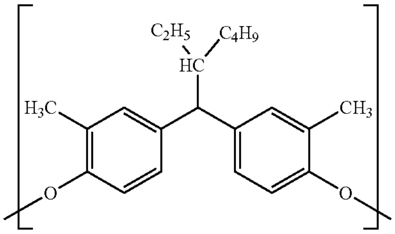
(B1-6)
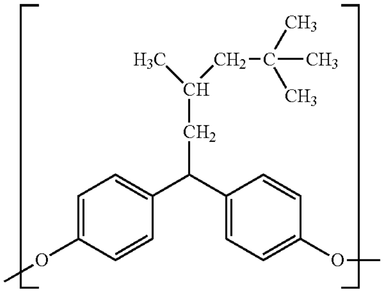
Hereinafter, diol units (B2-1) to (B2-11) are shown as specific examples of the diol unit (B2). The diol unit (B2) is not limited thereto.
(B2-1)
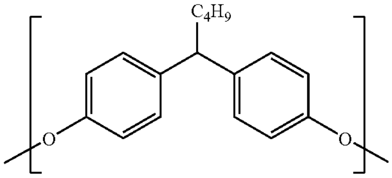
(B2-2)
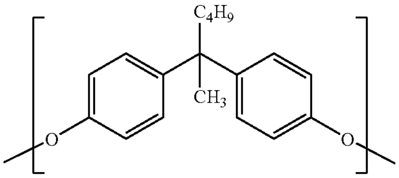
-continued
(B2-3)
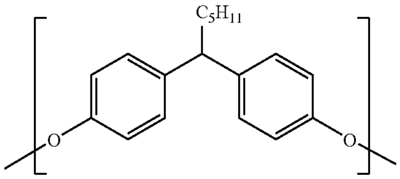
(B2-4)
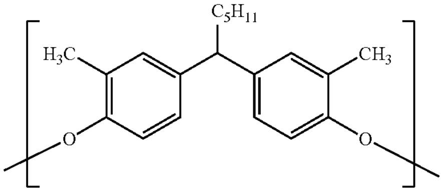
(B2-5)
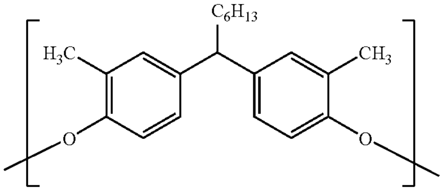
(B2-6)
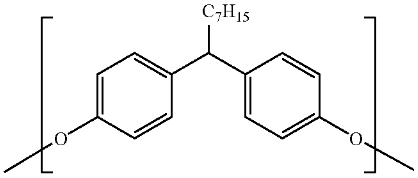
(B2-7)
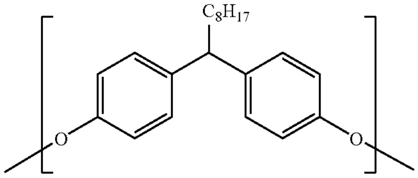
(B2-8)
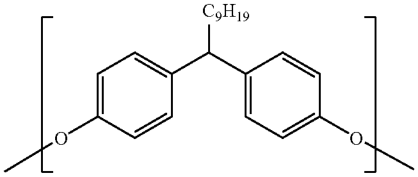
(B2-9)
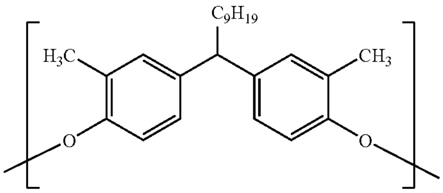
(B2-10)
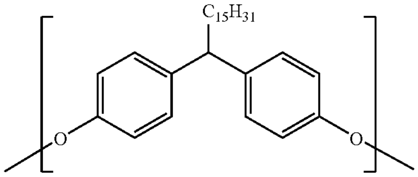

-continued (B2-11)

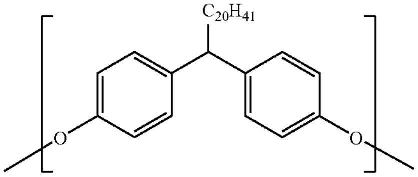

Hereinafter, diol units (B3-1) to (B3-4) are shown as specific examples of the diol unit (B3). The diol unit (B3) is not limited thereto.

(B3-1)

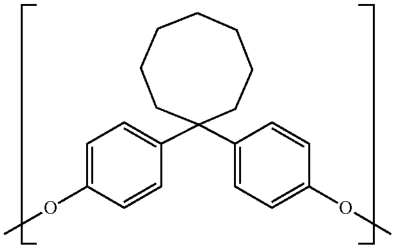

(B3-2)

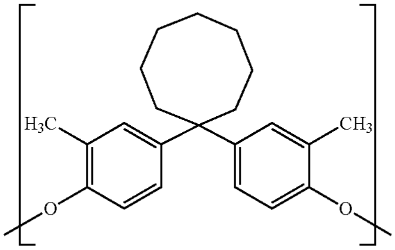

(B3-3)

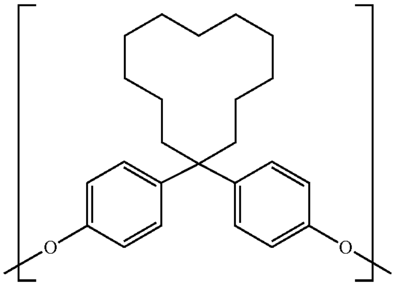

(B3-4)

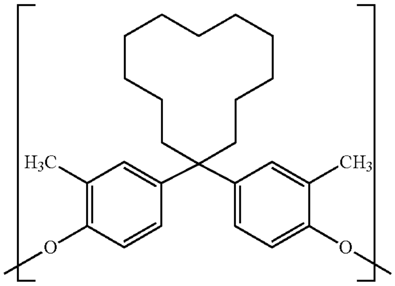

Hereinafter, diol units (B4-1) to (B4-7) are shown as specific examples of the diol unit (B4). The diol unit (B4) is not limited thereto.

(B4-1)

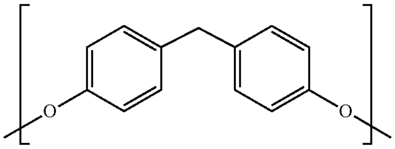

(B4-2)

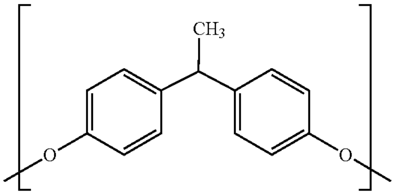

(B4-3)

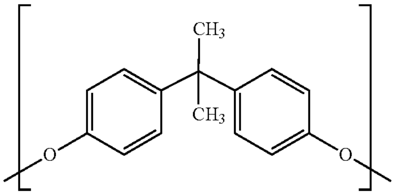

(B4-4)

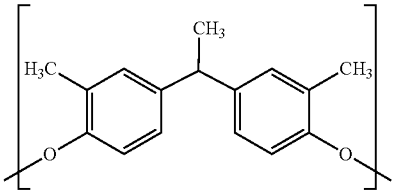

(B4-5)

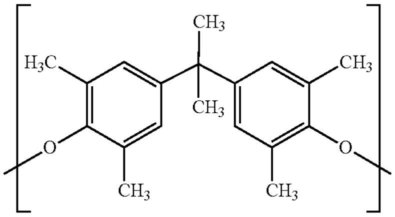

(B4-6)

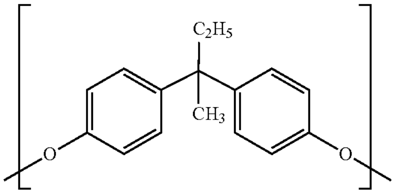

(B4-7)

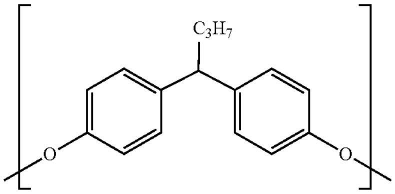

Hereinafter, diol units (B5-1) to (B5-6) are shown as specific examples of the diol unit (B5). The diol unit (B5) is not limited thereto.

(B5-1)
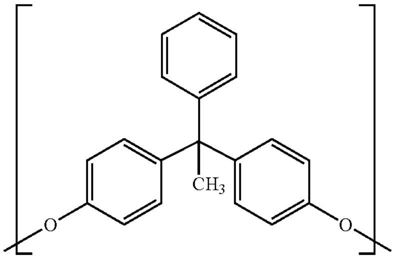
(B5-2)
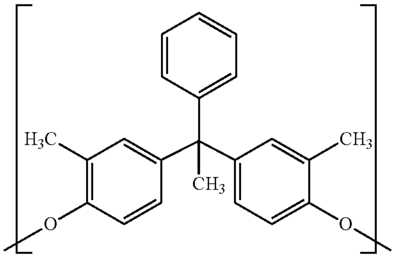
(B5-3)
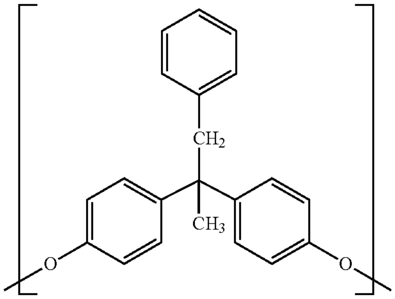
(B5-4)
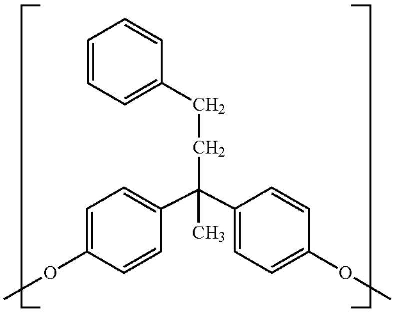
(B5-5)
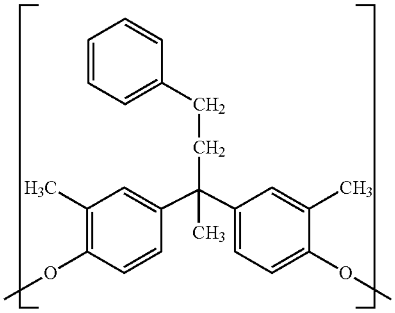
-continued
(B5-6)
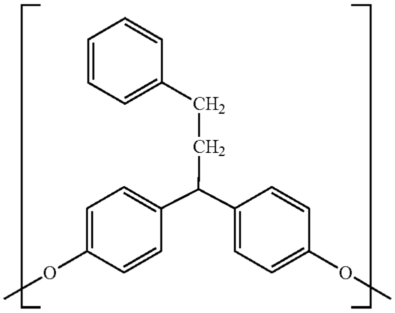
Hereinafter, diol units (B6-1) to (B6-4) are shown as specific examples of the diol unit (B6). The diol unit (B6) is not limited thereto.
(B6-1)
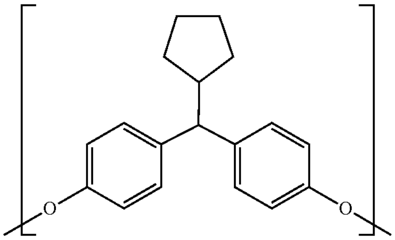
(B6-2)
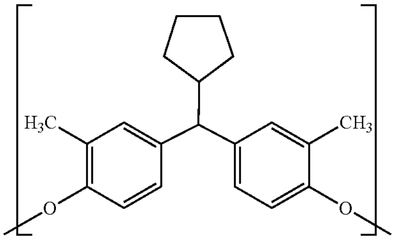
(B6-3)
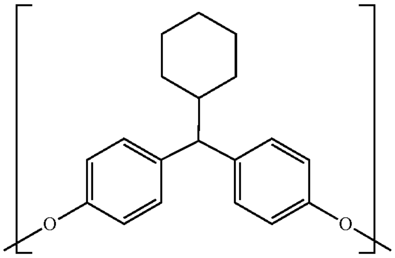
(B6-4)
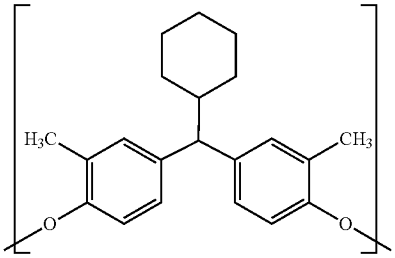
Hereinafter, diol units (B7-1) to (B7-3) are shown as specific examples of the diol unit (B7). The diol unit (B7) is not limited thereto.

(B7-1)

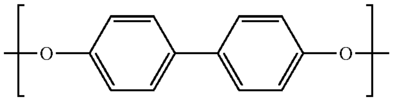

(B7-2)

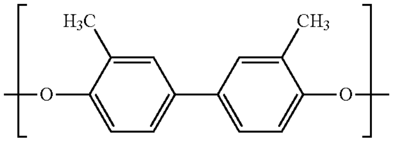

(B7-3)

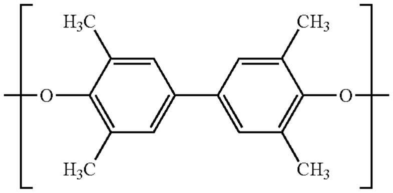

Hereinafter, diol units (B8-1) to (B8-3) are shown as specific examples of the diol unit (B8). The diol unit (B8) is not limited thereto.

(B8-1)

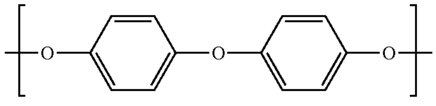

(B8-2)

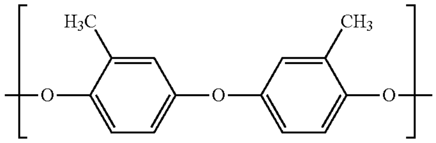

(B8-3)

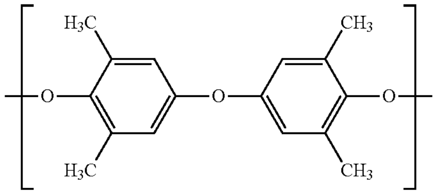

The diol unit (B) contained in the polyester resin (1) may be used alone or in combination of two or more kinds thereof.

The mass proportion of the diol unit (B) in the polyester resin (1) is, for example, preferably 25% by mass or greater and 80% by mass or less.

In a case where the mass proportion of the diol unit (B) is 25% by mass or greater, peeling of the photosensitive layer can be further suppressed. From this viewpoint, the mass proportion of the diol unit (B) is, for example, more preferably 30% by mass or greater and still more preferably 35% by mass or greater.

In a case where the mass proportion of the diol unit (B) is 80% by mass or less, the solubility in a coating solution for forming the photosensitive layer is maintained, and thus the abrasion resistance can be improved. From this viewpoint, the mass proportion of the diol unit (B) is, for example, more preferably 75% by mass or less and still more preferably 70% by mass or less.

Examples of other diol units in addition to the diol unit (B) include aliphatic diol (such as ethylene glycol, diethylene glycol, triethylene glycol, propylene glycol, butanediol, hexanediol, and neopentyl glycol) units and alicyclic diol (such as cyclohexanediol, cyclohexane dimethanol, and hydrogenated bisphenol A) units. These diol units contained in the polyester resin (1) may be used alone or in combination of two or more kinds thereof.

A terminal of the polyester resin (1) may be sealed or modified with a terminal-sealing agent, a molecular weight modifier, or the like used in a case of the production. Examples of the terminal-sealing agent or the molecular weight modifier include monohydric phenol, monovalent acid chloride, monohydric alcohol, and monovalent carboxylic acid.

Examples of the monohydric phenol include phenol, o-cresol, m-cresol, p-cresol, o-ethylphenol, m-ethylphenol, p-ethylphenol, o-propylphenol, m-propylphenol, p-propylphenol, o-tert-butylphenol, m-tert-butylphenol, p-tert-butylphenol, pentylphenol, hexylphenol, octylphenol, nonylphenol, a 2,6-dimethylphenol derivative, a 2-methylphenol derivative, o-phenylphenol, m-phenylphenol, p-phenylphenol, o-methoxyphenol, m-methoxyphenol, p-methoxyphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl)propane, 2-phenyl-2-(2-hydroxyphenyl)propane, and 2-phenyl-2-(3-hydroxyphenyl) propane.

Examples of the monovalent acid chloride include monofunctional acid halides such as benzoyl chloride, benzoic acid chloride, methanesulfonyl chloride, phenylchloroformate, acetic acid chloride, butyric acid chloride, octyl acid chloride, benzenesulfonyl chloride, benzenesulfinyl chloride, sulfinyl chloride, benzene phosphonyl chloride, and substituents thereof.

Examples of the monohydric alcohol include methanol, ethanol, n-propanol, isopropanol, n-butanol, 2-butanol, pentanol, hexanol, dodecyl alcohol, stearyl alcohol, benzyl alcohol, and phenethyl alcohol.

Examples of the monovalent carboxylic acid include acetic acid, propionic acid, octanoic acid, cyclohexanecarboxylic acid, benzoic acid, toluic acid, phenylacetic acid, p-tert-butylbenzoic acid, and p-methoxyphenylacetic acid.

The weight-average molecular weight of the polyester resin (1) is, for example, preferably 30,000 or greater and 300,000 or less, more preferably 40,000 or greater and 250,000 or less, and still more preferably 50,000 or greater and 200,000 or less.

The molecular weight of the polyester resin (1) is a molecular weight measured by gel permeation chromatography (GPC) in terms of polystyrene. The GPC is carried out by using tetrahydrofuran as an eluent.

The polyester resin (1) can be obtained by polycondensing a monomer providing a dicarboxylic acid unit (A), a monomer providing a diol unit (B), and other monomers as necessary using a method of the related art. Examples of the method of polycondensing monomers include an interfacial polymerization method, a solution polymerization method, and a melt polymerization method. The interfacial polymerization method is a polymerization method of mixing a divalent carboxylic acid halide dissolved in an organic solvent that is incompatible with water and dihydric alcohol dissolved in an alkali aqueous solution to obtain polyester. Examples of documents related to the interfacial polymerization method include W. M. EARECKSON, J. Poly. Sci., XL399, 1959, and JP1965-1959B (JP-S40-1959B). Since the interfacial polymerization method enables the reaction to proceed faster than the reaction carried out by the solution polymerization method and also enables suppression of hydrolysis of the divalent carboxylic acid halide, as a result, a high-molecular-weight polyester resin can be obtained.

Examples of a method of decreasing the amount of the chemical substance (AA) contained in the polyester resin (1) include the following methods.

In a case of polymerization of the polyester resin (1), examples of such a method include a method of increasing the purity of the monomer serving as a raw material, a method of sufficiently dissolving the monomer and initiating the polymerization reaction, and a method of setting the concentration of the dicarboxylic acid (specifically, dicarboxylic acid chloride) in the polymerization reaction system to be low.

After the polymerization of the polyester resin (1), examples of such a method include a method of reprecipitating the polyester resin (1) in a solvent (such as alcohol) that is a poor solvent for the polyester resin and a good solvent for the chemical substance (AA) and a method of performing an amine treatment on the polyester resin.

Chemical Substance (AA)

The chemical substance (AA) is a chemical substance represented by Formula (AA).

Formula (AA)

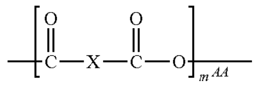

In Formula (AA), X represents an organic group, and $m^{AA}$ represents an integer.

X in Formula (AA) has the same definition as that for X in Formula (A). Examples of the organic group as X include an alkyl group, an aryl group, an aralkyl group, an alkoxy group, an aryloxy group, an ether group, a thioether group, and a combination of these groups.

$m^{AA}$ in Formula (AA) represents the repetition number of X (that is, the organic group). Since the chemical substance (AA) is a by-product contained in the polyester resin used as the binder resin of the charge transport layer or the single layer type photosensitive layer, $m^{AA}$ increases or decreases depending on the polymerization conditions during the synthesis of the polyester resin. $m^{AA}$ represents, for example, an integer of 1 or greater and 500 or less.

The chemical substance (AA) is generated, for example, in a case of the polymerization of the polyester resin (1) and is contained in the charge transport layer or the single layer type photosensitive layer by using the polyester resin (1) as a binder resin of the charge transport layer or the single layer type photosensitive layer.

In a case where the polyester resin (1) is used as a binder resin of the charge transport layer or the single layer type photosensitive layer, X in Formula (AA) has the same definition as that for X in Formula (A) related to the polyester resin (1). Similarly, $Ar^{AA1}$, $Ar^{AA2}$, $L^{AA}$, and $n^{AA1}$ in Formula (AA') each have the same definition as that for $Ar^{A1}$, $Ar^{A2}$, $L^{A}$, and $n^{A1}$ in Formula (A').

In a case where the number of X's in the dicarboxylic acid unit (A) constituting the polyester resin (1) is one, the number of X's in the chemical substance (AA) is also one. In a case where the number of X's in the dicarboxylic acid unit (A) constituting the polyester resin (1) is two or more, the number of X's in the chemical substance (AA) is also a combination of two or more kinds thereof.

Examples of the form of the chemical substance (AA) include the chemical substance (AA') represented by Formula (AA').

Formula (AA')

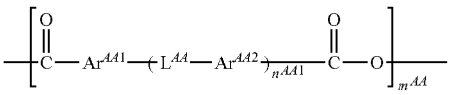

In Formula (AA'), $Ar^{AA1}$ and $Ar^{AA2}$ each independently represent an aromatic ring that may have a substituent, $L^{AA}$ represents a single bond or a divalent linking group, $n^{AA1}$ represents 0, 1, or 2, and $m^{AA}$ represents an integer.

The aromatic ring as $Ar^{AA1}$ may be any of a monocycle or a polycycle. Examples of the aromatic ring include a benzene ring, a naphthalene ring, an anthracene ring, and a phenanthrene ring.

The hydrogen atom on the aromatic ring as $Ar^{AA1}$ may be substituted with an alkyl group, an aryl group, an aralkyl group, an alkoxy group, an aryloxy group, a halogen atom, or the like. Examples of the substituent in a case where the aromatic ring as $Ar^{AA1}$ is substituted include an alkyl group having 1 or more and 10 or less carbon atoms, an aryl group having 6 or more and 12 or less carbon atoms, and an alkoxy group having 1 or more and 6 or less carbon atoms.

The aromatic ring as $Ar^{AA2}$ may be any of a monocycle or a polycycle. Examples of the aromatic ring include a benzene ring, a naphthalene ring, an anthracene ring, and a phenanthrene ring.

The hydrogen atom on the aromatic ring as $Ar^{AA2}$ may be substituted with an alkyl group, an aryl group, an aralkyl group, an alkoxy group, an aryloxy group, a halogen atom, or the like. Examples of the substituent in a case where the aromatic ring as $Ar^{AA2}$ is substituted include an alkyl group having 1 or more and 10 or less carbon atoms, an aryl group having 6 or more and 12 or less carbon atoms, and an alkoxy group having 1 or more and 6 or less carbon atoms.

In a case where $L^{AA}$ represents a divalent linking group, examples of the divalent linking group includes an oxygen atom, a sulfur atom, and —C($Ra^{AA1}$) ($Ra^{AA2}$)-. Here, $Ra^{AA1}$ and $Ra^{AA2}$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^{AA1}$ and $Ra^{AA2}$ may be bonded to each other to form a cyclic alkyl group.

The alkyl group having 1 or more and 10 or less carbon atoms as $Ra^{AA1}$ and $Ra^{AA2}$ may be linear, branched, or cyclic. As an example of the form, the alkyl group may have 1 or more and 6 or less carbon atoms, 1 or more and 4 or less carbon atoms, or 1 or 2 carbon atoms.

The aryl group having 6 or more and 12 or less carbon atoms as $Ra^{AA1}$ and $Ra^{AA2}$ may be any of a monocycle or a polycycle. As an example of the form, the aryl group may have 6 or more and 10 or less carbon atoms or 6 carbon atoms.

The alkyl group in the aralkyl group having 7 or more and 20 or less carbon atoms as $Ra^{AA1}$ and $Ra^{AA2}$ may be linear, branched, or cyclic. As an example of the form, the alkyl group in the aralkyl group having 7 or more and 20 or less carbon atoms may have 1 or more and 4 or less carbon atoms, 1 or more and 3 or less carbon atoms, or 1 or 2 carbon atoms.

The aryl group in the aralkyl group having 7 or more and 20 or less carbon atoms as $Ra^{AA1}$ and $RaAA^2$ may be any of a monocycle or a polycycle. As an example of the form, the aryl group may have 6 or more and 10 or less carbon atoms or 6 carbon atoms.

Examples of the form of the chemical substance (AA) include a form of a chemical substance having at least one selected from the group consisting of a repeating unit (AA1) represented by Formula (AA1), a repeating unit (AA2) represented by Formula (AA2), a repeating unit (AA3) represented by Formula (AA3), and a repeating unit (AA4) represented by Formula (AA4).

Formula (AA1)

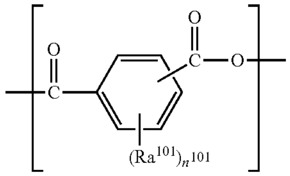

In Formula (AA1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{101}$ and $n^{101}$ in Formula (AA1) each have the same definition as that for $Ra^{101}$ and $n^{101}$ in Formula (A1), and the specific forms thereof are also the same as each other.

Formula (AA2)

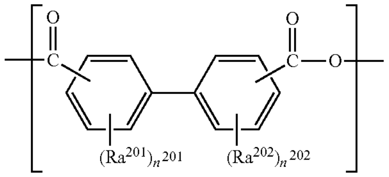

In Formula (AA2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{201}$, $Ra^{202}$, $n^{201}$, and $n^{202}$ in Formula (AA2) each have the same definition as that for $Ra^{201}$, $Ra^{202}$, $n^{201}$, and $n^{202}$ in Formula (A2), and the specific forms thereof are also the same as each other.

Formula (AA3)

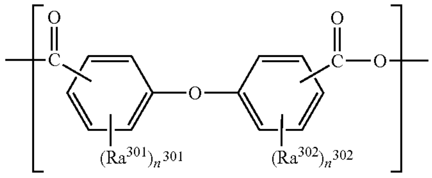

In Formula (AA3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{301}$, $Ra^{302}$, $n^{301}$, and $n^{302}$ in Formula (AA3) each have the same definition as that for $Ra^{301}$, $Ra^{302}$, $n^{301}$, and $n^{302}$ in Formula (A3), and the specific forms thereof are also the same as each other.

Formula (AA4)

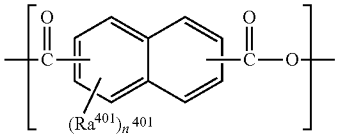

In Formula (AA4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$Ra^{401}$ and $n^{401}$ in Formula (AA4) each have the same definition as that for $Ra^{401}$ and $n^{401}$ in Formula (A4), and the specific forms thereof are also the same as each other.

In a case where the dicarboxylic acid unit (A) of the polyester resin (1) has any one or a plurality of Formulae (A1) to (A4), the chemical substance (AA) has any one or a plurality of Formulae (AA1) to (AA4) respectively corresponding to Formulae (A1) to (A4) as repeating units.

In a case where a plurality of kinds of dicarboxylic acids are used in a case of the polymerization of the polyester resin (1), specific examples of the chemical substance (AA) include a chemical substance having a plurality of kinds of combinations selected from a repeating unit (AA1) represented by Formula (AA1), a repeating unit (AA2) represented by Formula (AA2), a repeating unit (AA3) represented by Formula (AA3), and a repeating unit (AA4) represented by Formula (AA4).

Hereinafter, repeating units (AA1-1) to (AA1-9) are shown as specific examples of the repeating unit (AA1). The repeating unit (AA1) is not limited thereto.

(AA1-1)

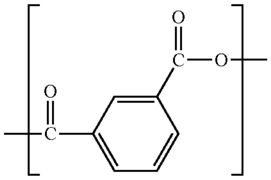

(AA1-2)

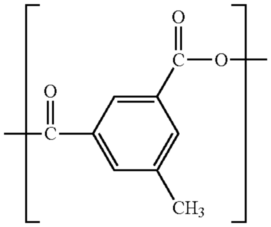

-continued (AA1-3)

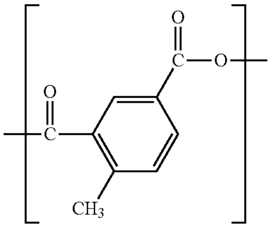

(AA1-4)

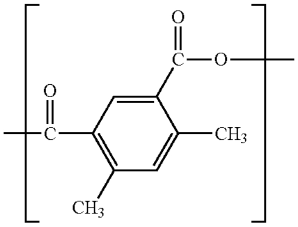

(AA1-5)

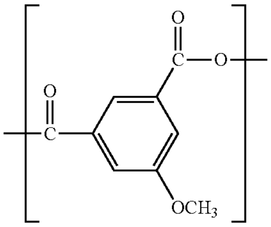

(AA1-6)

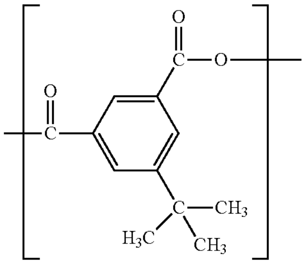

(AA1-7)

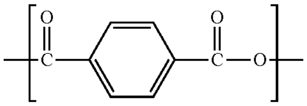

(AA1-8)

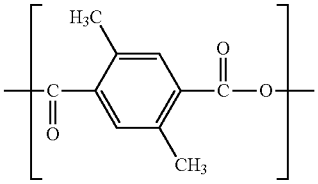

(AA1-9)

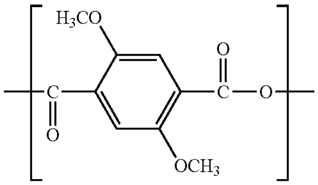

Hereinafter repeating units (AA2-1) to (AA2-3) are shown as specific examples of the repeating unit (AA2). The repeating unit (AA2) is not limited thereto.

(AA2-1)

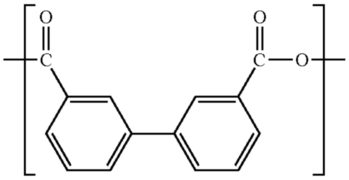

(AA2-2)

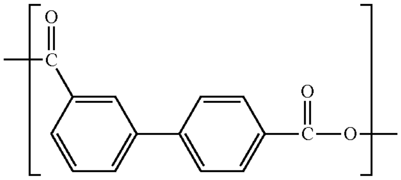

(AA2-3)

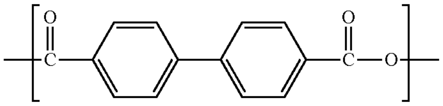

Hereinafter, repeating units (AA3-1) and (AA3-2) are shown as specific examples of the repeating unit (AA3). The repeating unit (AA3) is not limited thereto.

(AA3-1)

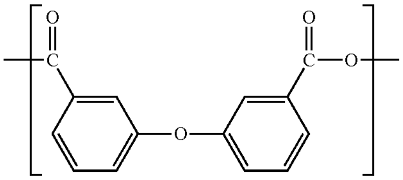

(AA3-2)

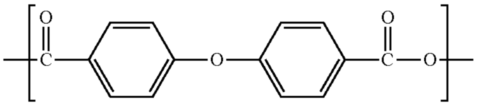

Hereinafter, repeating units (AA4-1) to (AA4-3) are shown as specific examples of the repeating unit (AA4). The repeating unit (AA4) is not limited thereto.

(AA4-1)

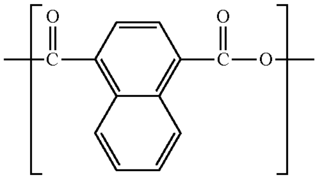

(AA4-2)

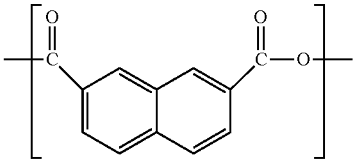

-continued (AA4-3)

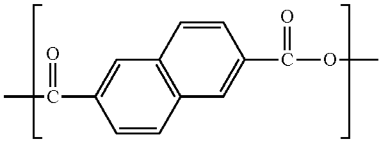

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $1\times10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. In a case where incoherent light is used as a light source, roughening of the surface to prevent interference fringes is not particularly necessary, and it is suitable for longer life because occurrence of defects due to the unevenness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42 °C or higher and 48 °C or lower. The film thickness of the coating film is, for example, preferably 0.3 μm or greater and 15 μm or less.

The boehmite treatment is carried out, for example, by immersing the conductive substrate in pure water at 90 °C or higher and 100 °C or lower for 5 minutes to 60 minutes or by bringing the conductive substrate into contact with heated steam at 90 °C or higher and 120 °C or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $1\times10^{2}$ Ωcm or greater and $1\times10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis (2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

The undercoat layer may contain an electron-accepting compound (acceptor compound) together with the inorganic particles from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophenone compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100 °C or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100 °C or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

The electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles.

Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The thickness of the undercoat layer is set to, for example, preferably 15 μm or greater and more preferably 20 μm or greater and 50 μm or less.

Interlayer

An interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, a knife coating method, and a curtain coating method.

The thickness of the interlayer is set to be, for example, preferably in a range of 0.1 μm or greater and 3 μm or less. The interlayer may be used as the undercoat layer.

Charge Generation Layer

The charge generation layer is, for example, a layer containing a charge generation material and a binder resin. Further, the charge generation layer may be a deposited layer of the charge generation material. The deposited layer of the charge generation material is, for example, suitable in a case where an incoherent light source such as a light emitting diode (LED) or an organic electro-luminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

The n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $1\times10^3$ Ωcm or greater. These binder resins may be used alone or in the form of a mixture of two or more kinds thereof.

The blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. The charge generation layer may be formed by vapor deposition of the charge generation material. The formation of the charge generation layer by vapor deposition is, for example, particularly preferable in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a fine flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The thickness of the charge generation layer is set to, for example, preferably 0.1 μm or greater and 5.0 μm or less and more preferably 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

Examples of the polymer charge transport material include known chemical substances having charge transport properties, such as poly-N-vinylcarbazole and polysilane. For example, a polyester-based polymer charge transport material is preferable. The polymer charge transport material may be used alone or in combination with a binder resin.

Examples of the charge transport material or the polymer charge transport material include a polycyclic aromatic compound, an aromatic nitro compound, an aromatic amine compound, a heterocyclic compound, a hydrazone compound, a styryl compound, an enamine compound, a benzidine compound, a triarylamine compound (particularly, a triphenylamine compound), a diamine compound, an oxadiazole compound, a carbazole compound, an organic polysilane compound, a pyrazoline compound, an indole compound, an oxazole compound, an isoxazole compound, a thiazole compound, a thiadiazole compound, an imidazole compound, a pyrazole compound, a triazole compound, a cyano compound, a benzofuran compound, an aniline compound, a butadiene compound, and a resin containing a group derived from any of these substances. Specific examples thereof include compounds described in paragraphs 0078 to 0080 of JP2021-117377A, paragraphs 0046 to 0048 of JP2019-035900A, paragraphs 0052 and 0053 of JP2019-012141A, paragraphs 0122 to 0134 of JP2021-071565A, paragraphs 0101 to 0110 of JP2021-015223A, paragraph 0116 of JP2013-097300A, paragraphs 0309 to 0316 of WO2019/070003A, paragraphs 0103 to 0107 of JP2018-159087A, and paragraphs 0102 to 0113 of JP2021-148818A.

From the viewpoint of the charge mobility, for example, it is preferable that the charge transport material contains at least one selected from the group consisting of a chemical substance (C1) represented by Formula (C1), a chemical substance (C2) represented by Formula (C2), a chemical substance (C3) represented by Formula (C3), and a chemical substance (C4) represented by Formula (C4).

Formula (C1)

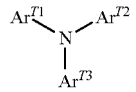

In Formula (C1), $Ar^{T1}$, $Ar^{T2}$, and $Ar^{T3}$ each independently represent an aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and RTS each independently represent a hydrogen atom, an alkyl group, or an aryl group. In a case where $R^{T5}$ and $R^{T6}$ represent an aryl group, the aryl groups may be linked via a divalent group of $—C(R^{51})(R^{52})—$ and/or $—C(R^{61})═C(R^{62})—$. $R^{51}$, $R^{52}$, $R^{61}$, and $R^{62}$ each independently represent a hydrogen atom or an alkyl group having 1 or more and 3 or less carbon atoms.

The group in Formula (C1) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the chemical substance (C1), for example, a chemical substance containing at least one of an aryl group or $—C_6H_4—CH═CH—CH═C(R^{T7})(R^{T8})$ is preferable, and a chemical substance (C'1) represented by Formula (C'1) is more preferable.

Formula (C'1)

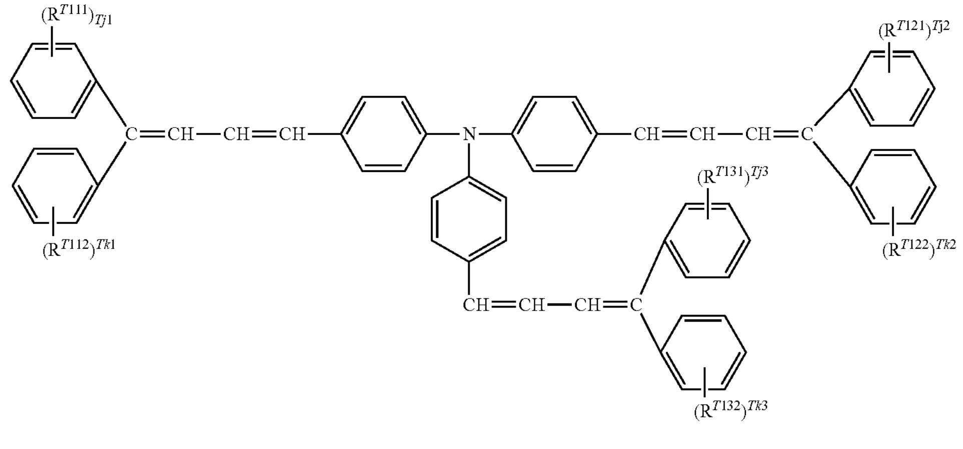

In Formula (C'1), $R^{T111}$, $R^{T112}$, $R^{T121}$, $R^{T122}$, $R^{T131}$, and $R^{T132}$ each independently represent a hydrogen atom, a halogen atom, an alkyl group (for example, preferably an alkyl group having 1 or more and 3 or less carbon atoms), an alkoxy group (for example, preferably an alkoxy group having 1 or more and 3 or less carbon atoms), a phenyl group, or a phenoxy group. Tj1, Tj2, Tj3, Tk1, Tk2, and Tk3 each independently represent 0, 1, or 2.

Formula (C2)

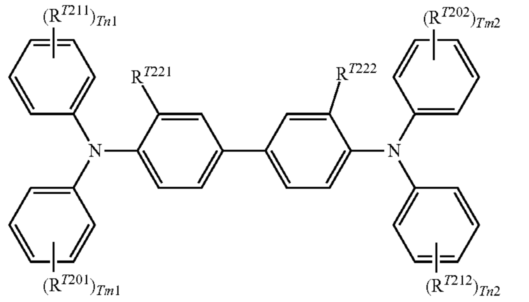

In Formula (C2), $R^{T201}$, $R^{T202}$, $R^{T211}$, and $R^{T212}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T21})=C(R^{T22})(R^{T23})$, or $—CH=CH—CH=C(R^{T24})(R^{T25})$. $R^{T21}$, $R^{T22}$, $R^{T23}$, $R^{T24}$, and $R^{T21}$ each independently represent a hydrogen atom, an alkyl group, or an aryl group. $R^{T221}$ and $R^{T222}$ each independently represent a hydrogen atom, a halogen atom, an alkyl groups having 1 or more and 5 or less carbon atoms, or an alkoxy group having 1 or more and 5 or less carbon atoms. Tm1, Tm2, Tn1, and Tn2 each independently represent 0, 1, or 2.

The group in Formula (C2) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the chemical substance (C2), for example, a chemical substance containing at least one of an alkyl group, an aryl group, or $—CH=CH—CH=C(R^{T24})(R^{T25})$ is preferable, and a chemical substance containing two of an alkyl group, an aryl group, or $—CH=CH—CH=C(R^{T24})(R^{T25})$ is more preferable.

Formula (C3)

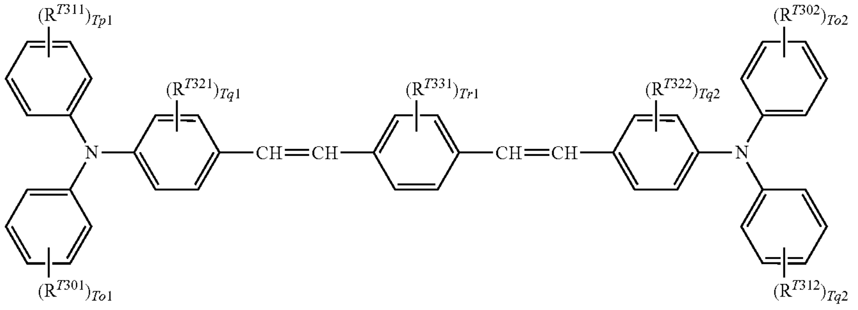

In Formula (C3), $R^{T301}$, $R^{T302}$, $R^{T311}$, and $R^{T312}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T31})=C(R^{T32})(R^{T33})$, or $—CH=CH—CH=C(R^{T34})(R^{T35})$. $R^{T31}$, $R^{T32}$, $R^{T33}$, $R^{T34}$, and $R^{T35}$ each independently represent a hydrogen atom, an alkyl group, or an aryl group. $R^{T321}$, $R^{T322}$, and $R^{T331}$ each independently represent a hydrogen atom, a halogen atom, an alkyl group having 1 or more and 5 or less carbon atoms, or an alkoxy group having 1 or more and 5 or less carbon atoms. To1, To2, Tp1, Tp2, Tq1, Tq2, and Tr1 each independently represent 0, 1, or 2.

The group in Formula (C3) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

Formula (C4)

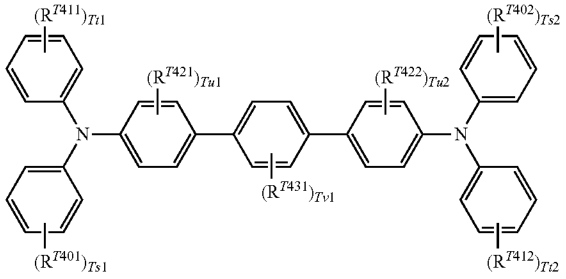

In Formula (C4), $R^{T401}$, $R^{T402}$, $R^{T411}$, and $R^{T412}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T41})=C(R^{T42})(R^{T43})$, or $—CH=CH—CH=C(R^{T44})(R^{T45})$ $R^{T41}$, $R^{T42}$, $R^{T43}$, $R^{T44}$, and $R^{T45}$ each independently represent a hydrogen atom, an alkyl group, or an aryl group. $R^{T421}$, $R^{T422}$, and $R^{T431}$ each independently represent a hydrogen atom, a halogen atom, an alkyl group having 1 or more and 5 or less carbon atoms, or an alkoxy group having 1 or more and 5 or less carbon atoms. Ts1, Ts2, Tt1, Tt2, Tu1, Tu2, and Tv1 each independently represent 0, 1, or 2.

The group in Formula (C4) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

The content of the charge transport material contained in the charge transport layer may be, for example, preferably 20% by mass or greater and 70% by mass or less with respect to the total mass of the charge transport layer.

It is preferable that the charge transport layer contains, for example, at least the polyester resin (1) as a binder resin. The proportion of the polyester resin (1) in the total amount of the binder resin contained in the charge transport layer is, for example, preferably 50% by mass or greater, more preferably 80% by mass or greater, still more preferably 90% by mass or greater, particularly preferably 95% by mass or greater, and most preferably 100% by mass.

The charge transport layer may contain other binder resins in addition to the polyester resin (1). Examples of other binder resins include a polyester resin other than the polyester resin (1), a polycarbonate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. These binder resins may be used alone or in combination of two or more kinds thereof.

The charge transport layer may also contain other known additives. Examples of the additives include an antioxidant, a leveling agent, an antifoaming agent, a filler, and a viscosity adjuster.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone- or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The average thickness of the charge transport layer is, for example, preferably 5 μm or greater and 60 μm or less, more preferably 10 μm or greater and 55 μm or less, and still more preferably 15 μm or greater and 50 μm or less.

Single Layer Type Photosensitive Layer

The single layer type photosensitive layer (charge generation/charge transport layer) is a layer containing a charge generation material, a charge transport material, a binder resin, and as necessary, other additives. These materials are the same as the materials described in the sections of the charge generation layer and the charge transport layer.

It is preferable that the single layer type photosensitive layer contains, for example, at least the polyester resin (1) as a binder resin. The proportion of the polyester resin (1) in the total amount of the binder resin contained in the single layer type photosensitive layer is, for example, preferably 50% by mass or greater, more preferably 80% by mass or greater, still more preferably 90% by mass or greater, particularly preferably 95% by mass or greater, and most preferably 100% by mass.

The content of the charge generation material in the single layer type photosensitive layer may be, for example, 0.1% by mass or greater and 10% by mass or less and preferably 0.8% by mass or greater and 5% by mass or less with respect to the total solid content.

The content of the charge transport material contained in the single layer type photosensitive layer may be, for example, 40% by mass or greater and 60% by mass or less with respect to the total solid content.

The method of forming the single layer type photosensitive layer is the same as the method of forming the charge generation layer or the charge transport layer.

The average thickness of the single layer type photosensitive layer is, for example, preferably 5 μm or greater and 60 μm or less, more preferably 10 μm or greater and 55 μm or less, and still more preferably 15 μm or greater and 50 μm or less.

Protective Layer

A protective layer is provided on the photosensitive layer as necessary. The protective layer is provided, for example, for the purpose of preventing a chemical change in the photosensitive layer during charging and further improving the mechanical strength of the photosensitive layer.

Therefore, for example, a layer formed of a cured film (crosslinked film) may be applied to the protective layer. Examples of these layers include the layers described in the items 1) and 2) below.

1) A layer formed of a cured film of a composition containing a reactive group-containing charge transport material having a reactive group and a charge-transporting skeleton in an identical molecule (that is, a layer containing a polymer or a crosslinked body of the reactive group-containing charge transport material)
2) A layer formed of a cured film of a composition containing a non-reactive charge transport material and a reactive group-containing non-charge transport material containing a reactive group without having a charge-transporting skeleton (that is, a layer containing the non-reactive charge transport material and a polymer or crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], $—NH_2$, —SH, —COOH, and $—SiR^{Q1}{}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization and is, for example, a functional group containing a group having at least a carbon double bond. Specific examples thereof include a vinyl group, a vinyl ether group, a vinyl thioether group, a phenyl vinyl group, a vinyl phenyl group, an acryloyl group, a methacryloyl group, and a group containing at least one selected from derivatives thereof. Among these, from the viewpoint that the reactivity is excellent, for example, a vinyl group, a phenylvinyl group, a vinylphenyl group, an acryloyl group, a methacryloyl group, and a group containing at least one selected from derivatives thereof are preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, or a hydrazone-based compound. Among these, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming a protective layer in which the above-described components are added to a solvent is formed, and the coating film is dried and, as necessary, subjected to a curing treatment such as heating.

Examples of the solvent for preparing the coating solution for, forming a protective layer include an aromatic solvent such as toluene or xylene; a ketone-based solvent such as methyl ethyl ketone, methyl isobutyl ketone, or cyclohexanone; an ester-based solvent such as ethyl acetate or butyl acetate; an ether-based solvent such as tetrahydrofuran or dioxane; a cellosolve-based solvent such as ethylene glycol monomethyl ether; and an alcohol-based solvent such as isopropyl alcohol or butanol. These solvents are used alone or in the form of a mixture of two or more kinds thereof.

The coating solution for forming a protective layer may be a solvent-less coating solution.

Examples of the method of coating the photosensitive layer (such as the charge transport layer) with the coating solution for forming a protective layer include typical coating methods such as a dip coating method, a push-up coating method, a wire bar coating method, a spray coating method, a blade coating method, a knife coating method, and a curtain coating method.

The thickness of the protective layer is set to, for example, preferably 1 μm or greater and 20 μm or less and more preferably 2 μm or greater and 10 μm or less.

Image Forming Apparatus and Process Cartridge

An image forming apparatus according to the present exemplary embodiment includes the electrophotographic photoreceptor, a charging unit that charges a surface of the electrophotographic photoreceptor, an electrostatic latent image forming unit that forms an electrostatic latent image on the surface of the charged electrophotographic photoreceptor, a developing unit that develops the electrostatic latent image formed on the surface of the electrophotographic photoreceptor with a developer containing a toner to form a toner image, and a transfer unit that transfers the toner image to a surface of a recording medium. Further, the electrophotographic photoreceptor according to the present exemplary embodiment is employed as the electrophotographic photoreceptor.

As the image forming apparatus according to the present exemplary embodiment, a known image forming apparatus such as an apparatus including a fixing unit that fixes the toner image transferred to the surface of a recording medium; a direct transfer type apparatus that transfers the toner image formed on the surface of the electrophotographic photoreceptor directly to the recording medium; an intermediate transfer type apparatus that primarily transfers the toner image formed on the surface of the electrophotographic photoreceptor to the surface of the intermediate transfer member and secondarily transfers the toner image transferred to the surface of the intermediate transfer member to the surface of the recording medium; an apparatus including a cleaning unit that cleans the surface of the electrophotographic photoreceptor after the transfer of the toner image and before the charging; an apparatus including a destaticizing unit that irradiates the surface of the electrophotographic photoreceptor with destaticizing light after the transfer of the toner image and before the charging; or an apparatus including an electrophotographic photoreceptor heating member for increasing the temperature of the electrophotographic photoreceptor and decreasing the relative temperature is employed.

In a case of the intermediate transfer type apparatus, the transfer unit is, for example, configured to include an intermediate transfer member having a surface onto which the toner image is transferred, a primary transfer unit primarily transferring the toner image formed on the surface of the electrophotographic photoreceptor to the surface of the intermediate transfer member, and a secondary transfer unit secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

In the image forming apparatus according to the present exemplary embodiment, for example, the portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. The process cartridge may include, for example, at least one selected from the group consisting of a charging unit, an electrostatic latent image forming unit, a developing unit, and a transfer unit in addition to the electrophotographic photoreceptor.

Hereinafter, an example of the image forming apparatus according to the present exemplary embodiment will be described, but the present exemplary embodiment is not limited thereto. Further, main parts shown in the figures will be described, but description of other parts will not be provided.

Figure 3:
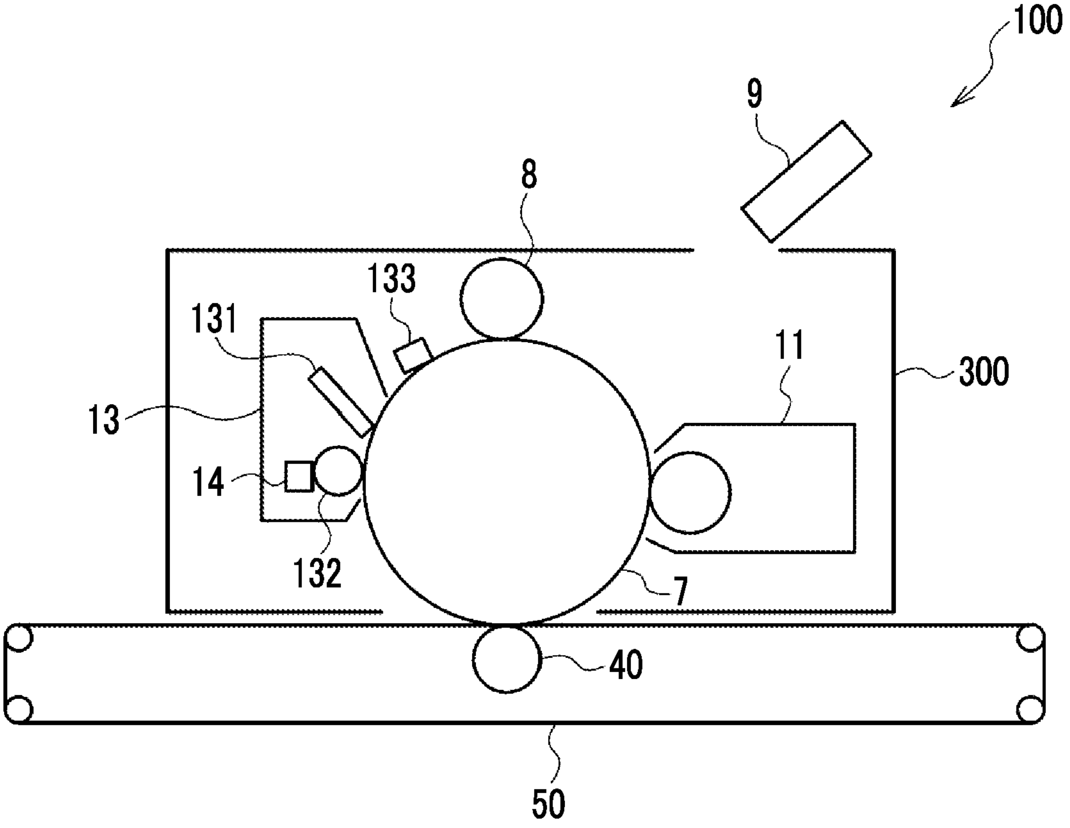
FIG. 3 is a schematic configuration view showing an example of an image forming apparatus according to the present exemplary embodiment.

FIG. 3 is a schematic configuration view showing an example of an image forming apparatus according to the present exemplary embodiment.

As shown in FIG. 3, an image forming apparatus 100 according to the present exemplary embodiment includes a process cartridge 300 including an electrophotographic photoreceptor 7, an exposure device 9 (an example of an electrostatic latent image forming unit), and a transfer device 40 (primary transfer device), and an intermediate transfer member 50. In the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording, medium (for example, paper). The intermediate transfer member 50, the transfer device 40 (primary transfer device), and the secondary transfer device (not shown) correspond to an example of the transfer unit.

The process cartridge 300 in FIG. 3 integrally supports the electrophotographic photoreceptor 7, a charging device 8 (an example of the charging unit), a developing device 11 (an example of the developing unit), and a cleaning device 13 (an example of the cleaning unit) in a housing. The cleaning device 13 has a cleaning blade (an example of the cleaning member) 131, and the cleaning blade 131 is disposed to come into contact with the surface of the electrophotographic photoreceptor 7. The cleaning member may be a conductive or insulating fibrous member instead of the aspect of the cleaning blade 131, and may be used alone or in combination with the cleaning blade 131.

FIG. 3 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

Charging Device

As the charging device 8, for example, a contact-type charger formed of a conductive or semi-conductive charging roller, a charging brush, a charging film, a charging rubber blade, a charging tube, or the like is used. Further, known chargers such as a non-contact type roller charger, a scorotron charger using corona discharge, and a corotron charger are also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of approximately 600 nm or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

Cleaning Device

As the cleaning device 13, a cleaning blade type device including the cleaning blade 131 is used. In addition to the cleaning blade type device, a fur brush cleaning type device or a simultaneous development cleaning type device may be employed.

Transfer Device

Examples of the transfer device 40 include transfer chargers known per se, for example, a contact-type transfer charger formed of a belt, a roller, a film, and a rubber blade, a scorotron transfer charger using corona discharge, and a corotron transfer charger.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 4:
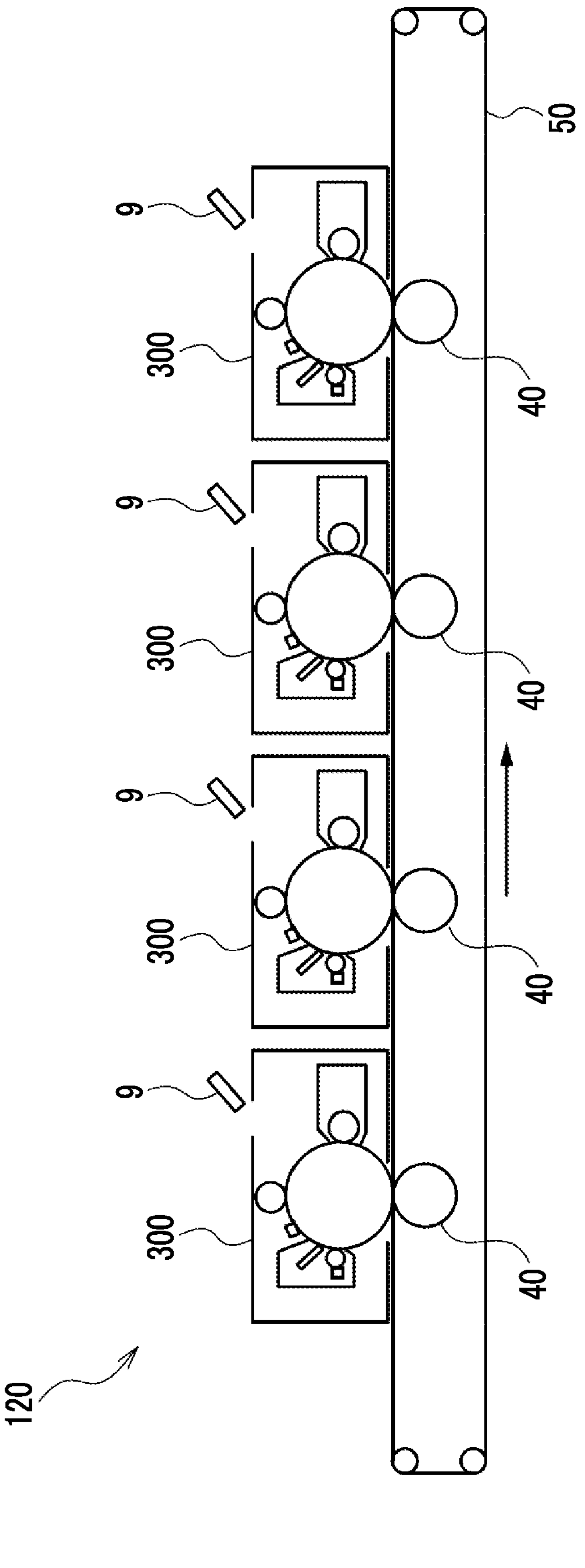
FIG. 4 is a schematic configuration view showing another example of an image forming apparatus according to the present exemplary embodiment.

FIG. 4 is a schematic configuration view showing an example of an image forming apparatus according to the present exemplary embodiment.

An image forming apparatus 120 shown in FIG. 4 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. The image forming apparatus 120 has the same configuration as the image forming apparatus 100 except that the image forming apparatus 120 is of a tandem type.

Examples

Hereinafter, exemplary embodiments of the invention will be described in detail based on examples, but the exemplary embodiments of the invention are not limited to the examples.

In the following description, "parts" and "%" are on a mass basis unless otherwise specified.

In the following description, the synthesis, the treatment, the production, and the like are carried out at room temperature (25 °C±3 °C) unless otherwise specified.

Production of Polyester Resin (1)

Polyester Resin (1-1)

47.59 g of 4,4'-(2-ethylhexylidene)diphenol and 33.06 g of triethylamine are added to a reaction container equipped with a stirrer, and 260 mL of methylene chloride is added thereto to prepare a solution. 45.32 g of 4,4'-biphenyldicarbonyl chloride (HPLC purity: 98.8%) is added, in a state of powder, to the solution while being stirred at a temperature of 5 °C. After completion of the addition, the polymerization reaction is allowed to proceed by increasing the temperature of the solution to 30 °C and stirring the solution for 4 hours in a nitrogen atmosphere. Further, the solution after the polymerization is subjected to the following purification treatment. The obtained solution is diluted with 300 ml of tetrahydrofuran, and methanol is poured into the solution to precipitate the polyester resin. The precipitated resin is separated by filtration, washed with methanol, and dried at 50 °C. The obtained polyester resin is redissolved in 300 ml of tetrahydrofuran, and the mixture is poured into methanol to reprecipitate the polyester resin. The precipitated resin is separated by filtration, washed with methanol, and dried at 50 °C, thereby obtaining 71.8 g of a polyester resin (1-1).

Polyester Resin (1-2)

71.0 g of a polyester resin (1-2) is obtained in the same manner as in the production of the polyester resin (1-1) except that "45.32 g of 4,4'-biphenyldicarbonyl chloride (HPLC purity: 98.8%)" is changed to "45.00 g of 4,4'-biphenyldicarbonyl chloride (HPLC purity: 99.5%)".

Polyester Resin (1-3)

30 g of the polyester resin (1-1) is dissolved in 170 g of tetrahydrofuran, 1.5 g of diethylamine is added thereto, and the mixture is stirred for 30 minutes. Next, methanol is poured into the solution to precipitate the polyester resin. The precipitated resin is separated by filtration, washed with methanol, and dried at 50 °C. The obtained polyester resin is redissolved in 150 ml of tetrahydrofuran, and the mixture is poured into methanol to reprecipitate the polyester resin. The precipitated resin is separated by filtration, washed with methanol, and dried at 50 °C, thereby obtaining 26.4 g of a polyester resin (1-3).

Polyester Resin (1-4)

12.64 g of 4,4'-(2-ethylhexylidene)diphenol, 0.193 g of 4-t-butylphenol, 0.0572 g of sodium hydrosulfite, and 230 mL of water are added to a reaction container equipped with a stirrer to prepare a suspension. 4.8378 g of sodium hydroxide, 0.1981 g of benzyltributylammonium chloride, and 150 mL of water are added to the suspension while being stirred at room temperature (20 °C), and the mixture is stirred for 30 minutes in a nitrogen atmosphere to obtain a solution in which the solid matter is almost dissolved. 210 mL of dichloromethane is added to the aqueous solution, the solution is stirred for 30 minutes in a nitrogen atmosphere, and 12.00 g of 4,4'-biphenyldicarbonyl chloride (HPLC purity: 99.5%) is added thereto in a state of powder. After completion of the addition, the reaction is allowed to proceed by stirring the solution at room temperature (20 °C) for 4 hours in a nitrogen atmosphere. The solution after polymerization is diluted with 300 ml of dichloromethane, and the aqueous layer is removed. After the solution is washed with a dilute acetic acid solution and ion exchange water, the solution is poured into methanol to precipitate the polyester resin. The precipitated resin is separated by filtration and dried at 50 °C. The obtained polyester resin is redissolved in 900 ml of tetrahydrofuran, and the mixture is poured into methanol to precipitate the polyester resin. The precipitated resin is separated by filtration, washed with methanol, and dried at 50 °C, thereby obtaining 18.7 g of a polyester resin (1-4).

Polyester Resin (1-5)

70.4 g of a polyester resin (1-5) is obtained in the same manner as in the production of the polyester resin (1-3) except that "polyester resin (1-1)" is changed to "polyester resin (1-2)".

Polyester Resin (1-6)

70.3 g of a polyester resin (1-6) is obtained in the same manner as in the production of the polyester resin (1-1) except that "47.59 g of 4,4'-(2-ethylhexylidene)diphenol" is changed to "46.30 g of 1,1-bis(4-hydroxyphenyl)-1-phenylethane" and "45.32 g of 4,4'-biphenyldicarbonyl chloride (HPLC purity: 98.8%)" is changed to "45.00 g of 4,4'-biphenyldicarbonyl chloride (HPLC purity: 99.5%)".

Polyester Resin (1-7)

68.9 g of a polyester resin (1-7) is obtained in the same manner as in the production of the polyester resin (1-1) except that "47.59 g of 4,4'-(2-ethylhexylidene)diphenol" is changed to "43.10 g of 2,2-bis(4-hydroxyphenyl)-4-methylpentane" and "45.32 g of 4,4'-biphenyldicarbonyl chloride (HPLC purity: 98.8%)" is changed to "45.00 g of 4,4'-biphenyldicarbonyl chloride (HPLC purity: 99.5%)"

Polyester Resin (1-8)

71.0 g of a polyester resin (1-8) is obtained in the same manner as in the production of the polyester resin (1-1) except that "47.59 g of 4,4'-(2-ethylhexylidene)diphenol" is changed to "47.59 g of a diol serving as a raw material of the diol unit (B2-6)" and "45.32 g of 4,4'-biphenyldicarbonyl chloride (HPLC purity: 98.8%)" is changed to "45.00 g of 4,4'-biphenyldicarbonyl chloride (HPLC purity: 99.5%)".

Polyester Resin (1-9)

69.3 g of a polyester resin (1-9) is obtained in the same manner as in the production of the polyester resin (1-1) except that "47.59 g of 4,4'-(2-ethylhexylidene)diphenol" is changed to "43.10 g of 2,2-bis(4-hydroxyphenyl)-4-methylpentane" and "45.32 g of 4,4'-biphenyldicarbonyl chloride (HPLC purity: 98.8%)" is changed to "47.58 g of 4,4'-bis(chlorocarbonyl)diphenyl ether (HPLC purity: 99.5%)".

Polyester Resin (1-10)

71.2 g of a polyester resin (1-10) is obtained in the same manner as in the production of the polyester resin (1-1) except that "47.59 g of 4,4'-(2-ethylhexylidene)diphenol" is changed to "47.27 g of a diol serving as a raw material of the diol unit (B6-4)" and "45.32 g of 4,4'-biphenyldicarbonyl chloride (HPLC purity: 98.8%)" is changed to "38.06 g of 4,4'-bis(chlorocarbonyl)diphenyl ether (HPLC purity: 99.5%) and 8.16 g of 2,6-naphthalene dicarbonyl chloride (HPLC purity: 99.5%)".

Polyester Resin (1-11)

71.5 g of a polyester resin (1-11) is obtained in the same manner as in the production of the polyester resin (1-1) except that "47.59 g of 4,4'-(2-ethylhexylidene)diphenol" is changed to "56.22 g of a diol serving as a raw material of the diol unit (B3-3)" and "45.32 g of 4,4'-biphenyldicarbonyl chloride (HPLC purity: 98.8%)" is changed to "17.31 g of terephthalic acid chloride (HPLC purity: 99.5%) and 17.31 g of isophthalic acid chloride (HPLC purity: 99.5%)".

Polyester Resin (1-12)

66.9 g of a polyester resin (1-12) is obtained in the same manner as in the production of the polyester resin (1-9) except that "43.10 g of 2,2-bis(4-hydroxyphenyl)-4-methylpentane" is changed to "38.64 g of a diol serving as a raw material of the diol unit (B4-4)".

Polyester Resin (C1)

71.8 g of a polyester resin (C1) is obtained in the same manner as in the production of the polyester resin (1-1) except that "45.32 g of 4,4'-biphenyldicarbonyl chloride (HPLC purity: 98.8%)" is changed to "45.51 g of 4,4'-biphenyldicarbonyl chloride (HPLC purity: 98.4%)".

Tables 1 and 2 show "constitutional unit: compositional ratio" (for example, A2-3: 50). The compositional ratio is in units of mol % of each of the dicarboxylic acid unit and the diol unit.

A2-3 and the like listed in Tables 1 and 2 are specific examples of the dicarboxylic acid unit (A) described above.

B1-4 and the like listed in Tables 1 and 2 are specific examples of the diol unit (B) described above.

AA2-3 and the like listed in Tables 1 and 2 are specific examples of the above-described repeating unit of the chemical substance (AA).

Production of Photoreceptor Including Lamination Type Photosensitive Layer

Example S1

Formation of Undercoat Layer

An aluminum cylindrical tube having an outer diameter of 30 mm, a length of 250 mm, and a thickness of 1 mm is prepared as a conductive substrate.

100 parts of zinc oxide (average particle diameter of 70 nm, specific surface area of 15 $m^2/g$, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120 °C for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50 °C for 5 hours. Thereafter, the solid content is separated by filtration by carrying out filtration under reduced pressure and dried at 60 °C under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmp glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170 °C for 40 minutes to form an undercoat layer. The average thickness of the undercoat layer is 25 μm.

Formation of Charge Generation Layer

A mixture consisting of 15 parts of hydroxygallium phthalocyanine as a charge generation substance (Bragg angle (2θ±0.2°) of the X-ray diffraction spectrum using Cukα characteristic X-ray has diffraction peaks at at least positions of 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer, and dried at room temperature (25 °C±3 °C) to form a charge generation layer having an average thickness of 0.18 μm.

Formation of Charge Transport Layer 60 parts of the polyester resin (1-1) as a binder resin and 40 parts of CTM-1 as a charge transport material are dissolved in 270 parts of tetrahydrofuran and 30 parts of toluene, thereby obtaining a coating solution for forming a charge transport layer. The charge generation layer is immersed in and coated with the coating solution for forming a charge transport layer, and dried at 145 °C for 30 minutes to form a charge transport layer having an average thickness of 40 μm.

CTM-1

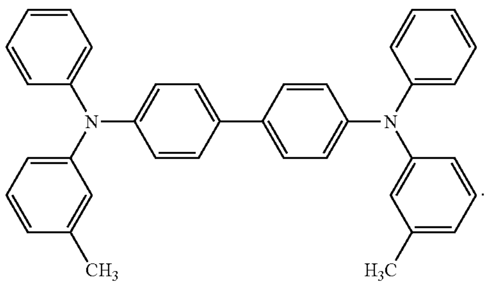

Examples S2 to S14 and Comparative Example SC1

Each photoreceptor is prepared in the same manner as in Example S1 except that the kind of the polyester resin (1), and the kind and amount of the charge transport material are changed as listed in Table 1 in the formation of the charge transport layer. The charge transport materials CTM-2 to CTM-6 are the following compounds.

CTM-2

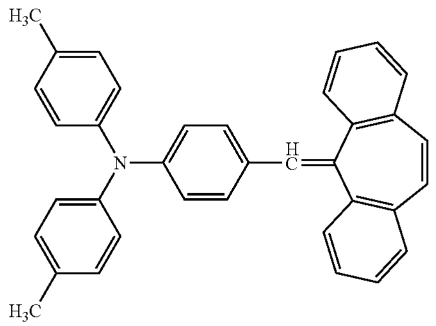

-continued

CTM-3

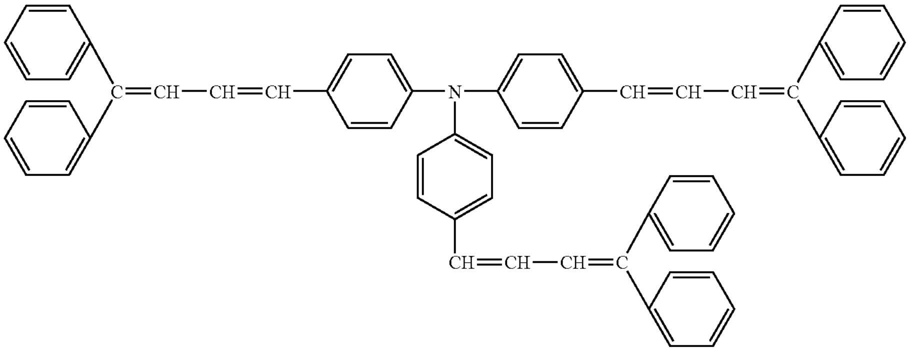

CTM-4

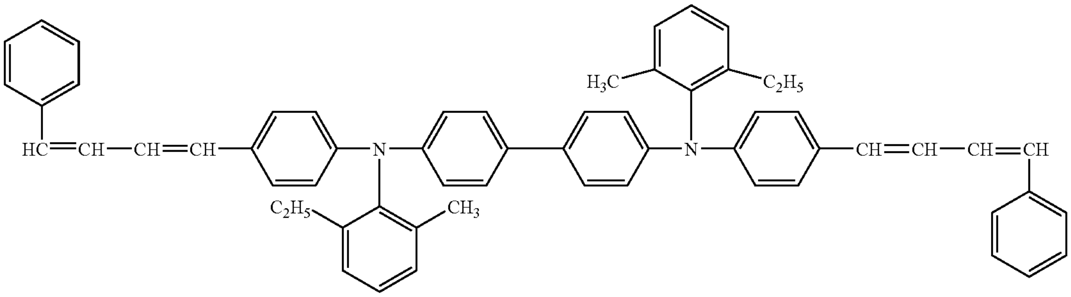

CTM-5

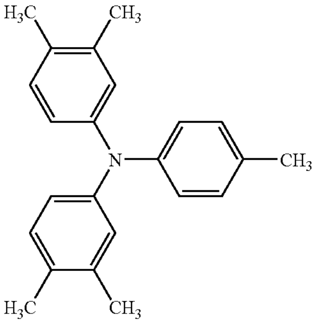

CTM-6

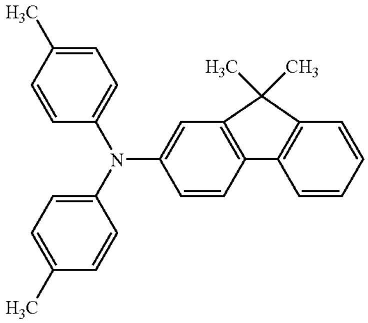

Example S15

A photoreceptor is prepared in the same manner as in Example S3 except that alizarin is changed to 2,3,4-trihydroxybenzophenone in the formation of the undercoat layer.

Production of Photoreceptor Including Single Layer Type Photosensitive Layer

Example T1

Formation of Single Layer Type Photosensitive Layer 52.75 parts of the polyester resin (1-1) as a binder resin, 1.25 parts of V-type hydroxygallium phthalocyanine as a charge generation material (Bragg angle (2θ±0.2°) of the X-ray diffraction spectrum using Cukα characteristic X-ray has diffraction peaks at at least positions of 7.3°, 16.0°, 24.9°, and 28.0°), 7.8 parts of ETM-1 as an electron transport material, 38.2 parts of CTM-1 as a charge transport material (mass ratio of 17:83 between ETM-1 and CTM-1), and 175 parts of tetrahydrofuran and 75 parts of toluene as solvents are mixed, and the mixture is subjected to a dispersion treatment in a sand mill for 4 hours using glass beads having a diameter of 1 mm, thereby obtaining a coating solution for forming a single layer type photosensitive layer.

An aluminum substrate having an outer diameter of 30 mm, a length of 244.5 mm, and a thickness of 1 mm is coated with the obtained coating solution for forming a photosensitive layer by a dip coating method, and dried and cured at a temperature of 110 °C for 40 minutes to form a single layer type photosensitive layer having an average thickness of 36 μm.

ETM-1

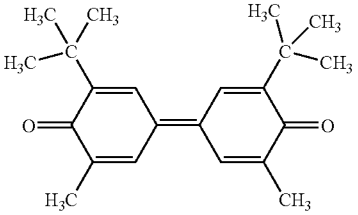

-continued

CTM-1

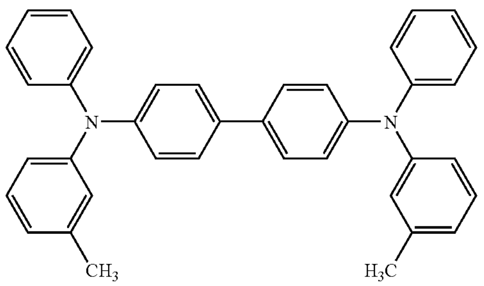

Examples T2 to T5 and Comparative Example TC1

Each photoreceptor is prepared in the same manner as in Example T1 except that the kind of the polyester resin (1) is changed as listed in Table 2 in the formation of the single layer type photosensitive layer.

Performance Evaluation of Photoreceptor

Burn-In Ghost

Figure 5A:
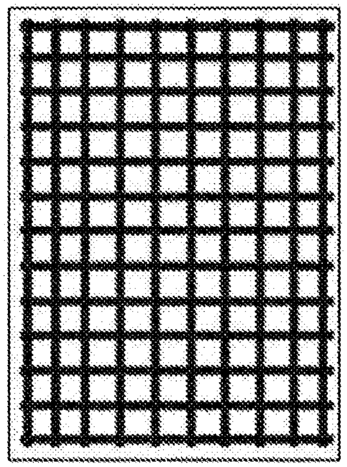
FIGS. 5A to 5D are views showing evaluation standards of burn-in ghosts in Examples.

The photoreceptor is mounted in an electrophotographic image forming apparatus (Versant 2100 Press, manufactured by FUJIFILM Business Innovation Corp.). A lattice-like chart image (cyan color) shown in FIG. 5A is formed on 3,000, 5,000, or 10,000 sheets of A3 size paper using the image forming apparatus in an environment of a temperature of 28 °C at a relative humidity of 85%, and 30 sheets of full-surface halftone images (cyan color) having an image density of 20% are continuously output. In the first, tenth, and thirtieth full-surface halftone images, the appearance of lattice-like images (ghosts) is visually observed, and the degree of the appearance is classified as follows. The evaluation results are listed in Tables 1 and 2.

Figure 5B:
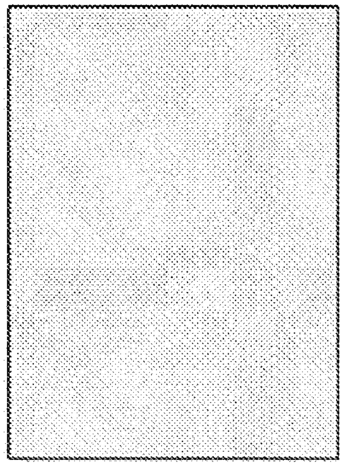

A: As shown in FIG. 5B, lattice-like images are not observed.

Figure 5C:
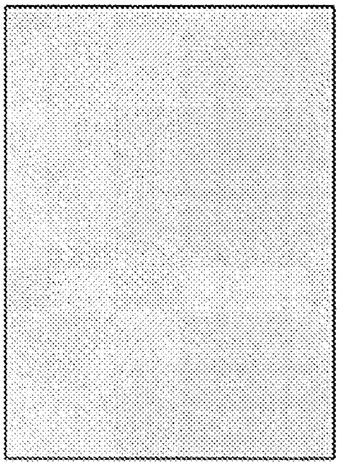

B: As shown in FIG. 5C, lattice-like images are slightly observed.

Figure 5D:
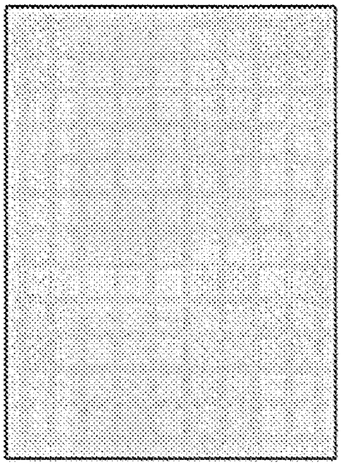

C: As shown in FIG. 5D, lattice-like images are clearly observed.

Charge Retention Properties

The photoreceptor is mounted in an electrophotographic image forming apparatus (DocuCentre-V C7775, manufactured by FUJIFILM Business Innovation Corp.). Further, a surface potential probe is provided in a region to be measured at a position separated from the surface of the photoreceptor by 1 mm using a surface potential meter (TREK 334, manufactured by Trek Co., Ltd.). The charge properties of the photoreceptor are evaluated as follows.

The charged surface potential is set to −700 V by the image forming apparatus, and full-surface halftone images with an image density of 30% are printed on 200,000 sheets of A4 size paper in a high-temperature and high-humidity environment (in an environment of a temperature of 28 °C at a relative humidity of 85%). Thereafter, the surface potential is measured by a surface potential meter and classified as follows. The evaluation results are listed in Tables 1 and 2.

A: The surface potential is −700 V or greater and less than −680 V

B: The surface potential is −680 V or greater and less than −660 V

C: The surface potential is −660 V or greater

TABLE 1

| | Polyester resin | | | Charge transport material | | Chemical substance (AA) | | Performance evaluation of photoreceptor | | |
|---|---|---|---|---|---|---|---|---|---|---|
| | | | | | | | | Number of printed sheets of lattice-like chart | | |
| | | | | | | | | 3000 sheets Observed halftone image | | |
| | Resin No. | Dicarboxylic acid unit Units (A1) to (A4) mol % | Diol unit Units (B1) to (B8) mol % | Type — | Addition amount % by mass (with respect to charge transport layer) | Structure — | Addition amount ppm (with respect to charge transport layer) | 1st sheet | 10th sheet | 30th sheet |
| Comparative Example SC1 | C1 | A2-3:50 | B1-4:50 | CTM-1 | 40 | AA2-3 | 2200 | C | B | B |
| Example S1 | 1-1 | A2-3:50 | B1-4:50 | CTM-1 | 40 | AA2-3 | 1900 | B | A | A |
| Example S2 | 1-2 | A2-3:50 | B1-4:50 | CTM-1 | 40 | AA2-3 | 450 | A | A | A |
| Example S3 | 1-3 | A2-3:50 | B1-4:50 | CTM-1 | 40 | AA2-3 | 170 | A | A | A |
| Example S4 | 1-4 | A2-3:50 | B1-4:50 | CTM-1 | 40 | AA2-3 | 80 | A | A | A |
| Example S5 | 1-5 | A2-3:50 | B1-4:50 | CTM-1 | 40 | AA2-3 | 7 | A | A | A |
| Example S6 | 1-6 | A2-3:50 | B5-1:50 | CTM-2 | 40 | AA2-3 | 400 | A | A | A |
| Example S7 | 1-7 | A2-3:50 | B1-2:50 | CTM-3 | 40 | AA2-3 | 350 | A | A | A |
| Example S8 | 1-8 | A2-3:50 | B2-6:50 | CTM-4 | 40 | AA2-3 | 420 | A | A | A |
| Example S9 | 1-2 | A2-3:50 | B1-4:50 | CTM-5 | 40 | AA2-3 | 450 | A | A | A |
| Example S10 | 1-9 | A3-2:50 | B1-2:50 | CTM-1 | 40 | AA3-2 | 200 | A | A | A |
| Example S11 | 1-10 | A3-2:40<br>A4-3:10 | B6-4:50 | CTM-1 | 40 | AA3-2<br>AA4-3 | 400 | A | A | A |
| Example S12 | 1-11 | A1-1:25<br>A1-7:25 | B3-3:50 | CTM-1 | 40 | AA1-1<br>AA1-7 | 170 | A | A | A |
| Example S13 | 1-12 | A3-2:50 | B4-4:50 | CTM-1 | 40 | AA3-2 | 180 | A | A | A |
| Example S14 | 1-6 | A2-3:50 | B5-1:50 | CTM-6 | 40 | AA2-3 | 400 | A | A | A |
| Example S15 | 1-3 | A2-3:50 | B1-4:50 | CTM-1 | 40 | AA2-3 | 170 | A | A | A |

TABLE 1-continued

| | Performance evaluation of photoreceptor | | | | | | |
|---|---|---|---|---|---|---|---|
| | Number of printed sheets of lattice-like chart | | | | | | |
| | 5000 sheets | | | 10000 sheets | | | |
| | Observed halftone image | | | | | | |
| | 1st sheet | 10th sheet | 30th sheet | 1st sheet | 10th sheet | 30th sheet | Charge retention properties |
| Comparative Example SC1 | C | C | B | C | C | C | A |
| Example S1 | B | A | A | B | B | A | A |
| Example S2 | A | A | A | B | B | A | A |
| Example S3 | A | A | A | B | A | A | A |
| Example S4 | A | A | A | A | A | A | A |
| Example S5 | A | A | A | A | A | A | C |
| Example S6 | A | A | A | B | B | A | A |
| Example S7 | A | A | A | B | B | A | A |
| Example S8 | A | A | A | B | B | A | A |
| Example S9 | B | B | A | B | B | B | A |
| Example S10 | A | A | A | B | A | A | A |
| Example S11 | A | A | A | B | B | A | A |
| Example S12 | A | A | A | B | A | A | A |
| Example S13 | A | A | A | B | A | A | A |
| Example S14 | A | A | A | B | B | A | A |
| Example S15 | A | A | A | B | A | A | A |

TABLE 2

| | Polyester resin | | | Chemical substance (AA) | | Performance evaluation of photoreceptor | | | | | | | | | |
|---|---|---|---|---|---|---|---|---|---|---|---|---|---|---|---|
| | | Dicarboxylic acid unit | Diol unit | | Content ppm (with respect to charge | Number of printed sheets of lattice-like chart | | | | | | | | | |
| | | Units (A1) to | Units (B1) to | | | 3000 sheets | | | 5000 sheets | | | 10000 sheets | | | |
| | | | | | | Observed halftone image | | | | | | | | | Charge |
| | Resin No. | (A4) mol % | (B8) mol % | Structure — | transport layer) | 1st sheet | 10th sheet | 30th sheet | 1st sheet | 10th sheet | 30th sheet | 1st sheet | 10th sheet | 30th sheet | retention properties |
| Comparative Example TC1 | C1 | A2-3:50 | B1-4:50 | AA2-3 | 2200 | B | B | B | C | C | B | C | C | C | A |
| Example T1 | 1-1 | A2-3:50 | B1-4:50 | AA2-3 | 1900 | A | A | A | B | A | A | B | A | A | A |
| Example T2 | 1-2 | A2-3:50 | Bl-4:50 | AA2-3 | 450 | A | A | A | A | A | A | B | B | A | A |
| Example T3 | 1-3 | A2-3:50 | Bl-4:50 | AA2-3 | 170 | A | A | A | A | A | A | B | A | A | A |
| Example T4 | 1-4 | A2-3:50 | Bl-4:50 | AA2-3 | 80 | A | A | A | A | A | A | A | A | A | A |
| Example T5 | 1-5 | A2-3:50 | Bl-4:50 | AA2-3 | 7 | A | A | A | A | A | A | A | A | A | C |

(((1)))

An electrophotographic photoreceptor comprising: a conductive substrate; and a lamination type photosensitive layer disposed on the conductive substrate and including a charge generation layer and a charge transport layer, wherein the charge transport layer contains a charge transport material and a polyester resin, and a mass proportion of a chemical substance (AA) represented by Formula (AA) in a total mass of the charge transport layer is 2,000 ppm or less.

(((2)))

The electrophotographic photoreceptor according to (((1))), wherein the mass proportion of the chemical substance (AA) in the total mass of the charge transport layer is 500 ppm or less.

(((3)))

The electrophotographic photoreceptor according to (((1))) or (((2))), wherein the chemical substance (AA) is a chemical substance (AA') represented by Formula (AA').

(((4)))

The electrophotographic photoreceptor according to any one of (((1))) to (((3))), wherein the chemical substance (AA) has at least one selected from the group consisting of a repeating unit (AA1) represented by Formula (AA1), a repeating unit (AA2) represented by Formula (AA2), a repeating unit (AA3) represented by Formula (AA3), and a repeating unit (AA4) represented Formula (AA4).

(((5)))

The electrophotographic photoreceptor according to any one of (((1))) to (((4))), wherein the polyester resin is a polyester resin (1) having a dicarboxylic acid unit (A) represented by Formula (A) and a diol unit (B) represented by Formula (B).

(((6)))

The electrophotographic photoreceptor according to (((5))), wherein the dicarboxylic acid unit (A) is a dicarboxylic acid unit (A') represented by Formula (A').

(((7)))

The electrophotographic photoreceptor according to (((5))) or (((6))), wherein the dicarboxylic acid unit (A) includes at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4).

(((8)))

The electrophotographic photoreceptor according to any one of (((5))) to (((7))), wherein the diol unit (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

(((9)))

The electrophotographic photoreceptor according to any one of (((1))) to (((8))), wherein the charge transport material contains at least one selected from the group consisting of a chemical substance (C1) represented by Formula (C1), a chemical substance (C2) represented by Formula (C2), a chemical substance (C3) represented by Formula (C3), and a chemical substance (C4) represented by Formula (C4).

(((10)))

An electrophotographic photoreceptor comprising: a conductive substrate; and a single layer type photosensitive layer disposed on the conductive substrate, wherein the single layer type photosensitive layer contains a charge transport material and a polyester resin, and a mass proportion of a chemical substance (AA) represented by Formula (AA) in a total mass of the single layer type photosensitive layer is 2,000 ppm or less.

(((11)))

The electrophotographic photoreceptor according to (((10))), wherein the mass proportion of the chemical substance (AA) in the total mass of the single layer type photosensitive layer is 500 ppm or less.

(((12)))

The electrophotographic photoreceptor according to (((10))) or ((((11)))), wherein the chemical substance (AA) is a chemical substance (AA') represented by Formula (AA').

(((13)))

The electrophotographic photoreceptor according to any one of (((10))) to (((12))), wherein the chemical substance (AA) has at least one selected from the group consisting of a repeating unit (AA1) represented by Formula (AA1), a repeating unit (AA2) represented by Formula (AA2), a repeating unit (AA3) represented by Formula (AA3), and a repeating unit (AA4) represented Formula (AA4).

(((14)))

The electrophotographic photoreceptor according to any one of (((10))) to (((13))), wherein the polyester resin is a polyester resin (1) having a dicarboxylic acid unit (A) represented by Formula (A) and a diol unit (B) represented by Formula (B).

(((15)))

The electrophotographic photoreceptor according to (((14))), wherein the dicarboxylic acid unit (A) is a dicarboxylic acid unit (A') represented by Formula (A').

((16)))

The electrophotographic photoreceptor according to (((14))) or (((15))), wherein the dicarboxylic acid unit (A) includes at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented Formula (A4).

(((17)))

The electrophotographic photoreceptor according to any one of (((14))) to (((16))), wherein the diol unit (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

(((18)))

The electrophotographic photoreceptor according to any one of (((10))) to (((17))), wherein the charge transport material contains at least one selected from the group consisting of a chemical substance (C1) represented by Formula (C1), a chemical substance (C2) represented by Formula (C2), a chemical substance (C3) represented by Formula (C3), and a chemical substance (C4) represented by Formula (C4).

(((19)))

A process cartridge comprising: the electrophotographic photoreceptor according to any one of (((10))) to (((18))), wherein the process cartridge is attachable to and detachable from an image forming apparatus.

(((20)))

An image forming apparatus comprising: the electrophotographic photoreceptor according to any one of (((10))) to (((18))); a charging unit that charges a surface of the electrophotographic photoreceptor; an electrostatic latent image forming unit that forms an electrostatic latent image on the surface of the charged electrophotographic photoreceptor; a developing unit that develops the electrostatic latent image formed on the surface of the electrophotographic photoreceptor with a developer containing a toner to form a toner image; and a transfer unit that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate; and a lamination type photosensitive layer disposed on the conductive substrate and including a charge generation layer and a charge transport layer, wherein the charge transport layer contains a charge transport material and a polyester resin, and a mass proportion of a chemical substance (AA) represented by Formula (AA) in a total mass of the charge transport layer is 80 ppm or more and 2,000 ppm or less, Formula (AA)

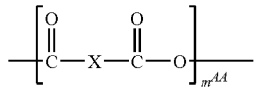

in Formula (AA), X represents an organic group, and $m^{AA}$ represents an integer, wherein the chemical substance (AA) has at least one selected from the group consisting of a repeating unit (AA1) represented by Formula (AA1), a repeating unit (AA2) represented by Formula (AA2), and a repeating unit (AA4) represented Formula (AA4), Formula (AA1)

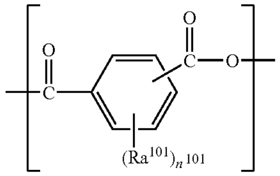

(Formula AA2)

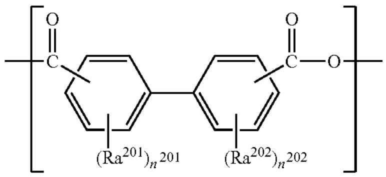

(Formula AA4)

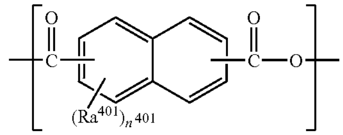

in Formula (AA1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (AA2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (AA4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

2. The electrophotographic photoreceptor according to claim 1, wherein the mass proportion of the chemical substance (AA) in the total mass of the charge transport layer is 80 ppm or more and 500 ppm or less.

3. The electrophotographic photoreceptor according to claim 1, wherein the polyester resin is a polyester resin (1) having a dicarboxylic acid unit (A) represented by Formula (A) and a diol unit (B) represented by Formula (B), Formula (A)

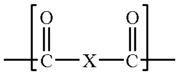

Formula (B)

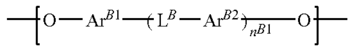

in Formula (A), X represents an organic group, in Formula (B), $Ar^{B1}$ and $Ar^{B2}$ each independently represent an aromatic ring that may have a substituent, $L^{B}$ represents a single bond, an oxygen atom, a sulfur atom, or —C($Rb^1$)($Rb^2$)—, and $n^{B1}$ represents 0, 1, or 2, and $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

4. The electrophotographic photoreceptor according to claim 3, wherein the dicarboxylic acid unit (A) is a dicarboxylic acid unit (A') represented by Formula (A'), Formula (A')

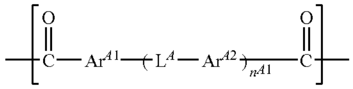

in Formula (A'), $Ar^{A1}$ and $Ar^{A2}$ each independently represent an aromatic ring that may have a substituent, $L^{A}$ represents a single bond or a divalent linking group, and $n^{A1}$ represents 0, 1, or 2.

5. The electrophotographic photoreceptor according to claim 3, wherein the diol unit (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8), Formula (B1)

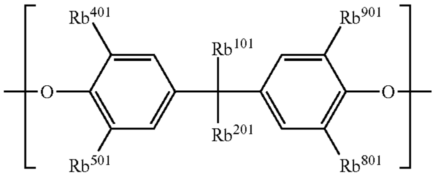

Formula (B2)

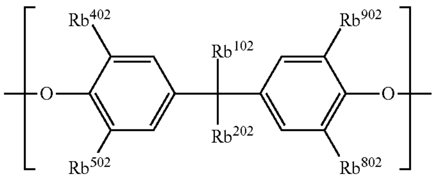

-continued

Formula (B3)

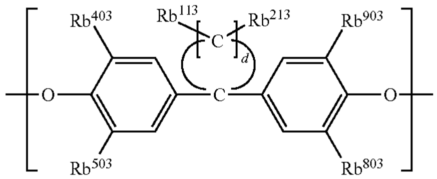

Formula (B4)

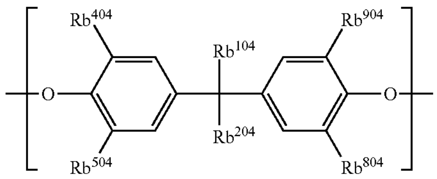

Formula (B5)

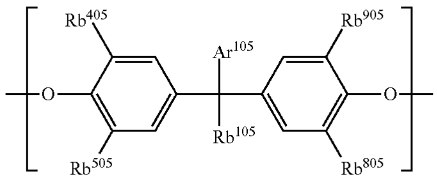

Formula (B6)

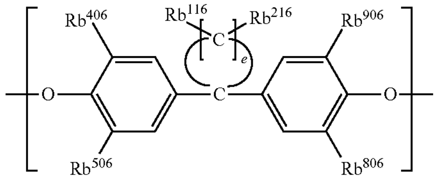

Formula (B7)

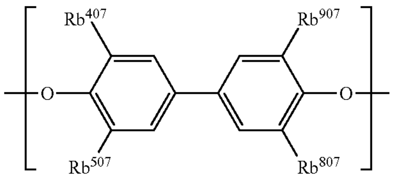

Formula (B8)

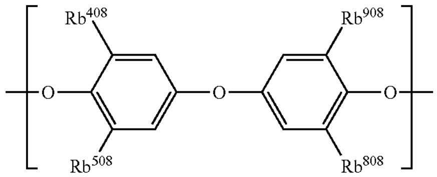

in Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, R202 represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

6. An electrophotographic photoreceptor comprising:

a conductive substrate; and a single layer type photosensitive layer disposed on the conductive substrate, wherein the single layer type photosensitive layer contains a charge transport material and a polyester resin, and a mass proportion of a chemical substance (AA) represented by Formula (AA) in a total mass of the single layer type photosensitive layer is 80 ppm or more and 2,000 ppm or less, Formula (AA)

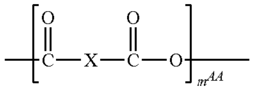

in Formula (AA), X represents an organic group, and $m^{AA}$ represents an integer, wherein the chemical substance (AA) has at least one selected from the group consisting of a repeating unit (AA1) represented by Formula (AA1), a repeating unit (AA2) represented by Formula (AA2), and a repeating unit (AA4) represented Formula (AA4), Formula (AA1)

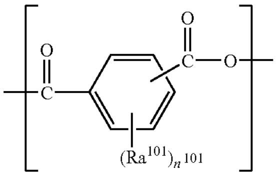

(Formula AA2)

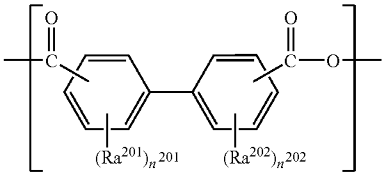

(Formula AA4)

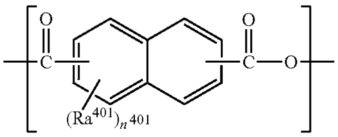

in Formula (AA1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (AA2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (AA4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

7. The electrophotographic photoreceptor according to claim 6, wherein the mass proportion of the chemical substance (AA) in the total mass of the single layer type photosensitive layer is 80 ppm or more and 500 ppm or less.

8. The electrophotographic photoreceptor according to claim 6, wherein the polyester resin is a polyester resin (1) having a dicarboxylic acid unit (A) represented by Formula (A) and a diol unit (B) represented by Formula (B), Formula (A)

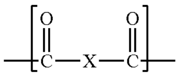

-continued

Formula (B)

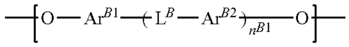

in Formula (A), X represents an organic group, in Formula (B), $Ar^{B1}$ and $Ar^{B2}$ each independently represent an aromatic ring that may have a substituent, $L^B$ represents a single bond, an oxygen atom, a sulfur atom, or —C($Rb^1$)($Rb^2$)—, and $n^{B1}$ represents 0, 1, or 2, and $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

9. The electrophotographic photoreceptor according to claim 8, wherein the dicarboxylic acid unit (A) is a dicarboxylic acid unit (A') represented by Formula (A'), Formula (A')

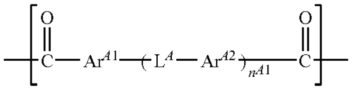

in Formula (A'), $Ar^{A1}$ and $Ar^{A2}$ each independently represent an aromatic ring that may have a substituent, $L^A$ represents a single bond or a divalent linking group, and $n^{A1}$ represents 0, 1, or 2.

10. The electrophotographic photoreceptor according to claim 8, wherein the dicarboxylic acid unit (A) includes at least one selected from the group consisting of a dicarboxylic acid unit (A1) represented by Formula (A1), a dicarboxylic acid unit (A2) represented by Formula (A2), and a dicarboxylic acid unit (A4) represented Formula (A4), Formula (A1)

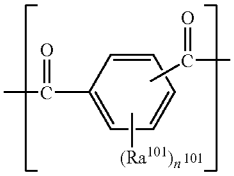

(Formula A2)

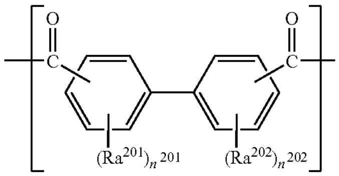

(Formula A4)

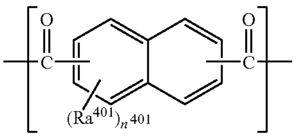

in Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

11. The electrophotographic photoreceptor according to claim 8, wherein the diol unit (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8), Formula (B1)

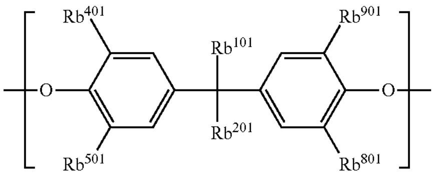

Formula (B2)

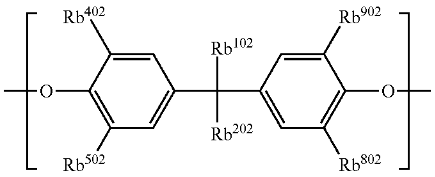

Formula (B3)

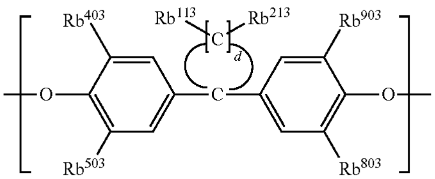

Formula (B4)

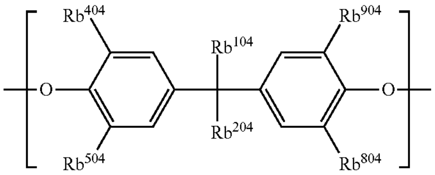

Formula (B5)

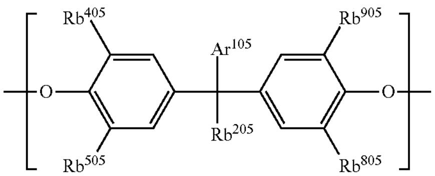

-continued

Formula (B6)

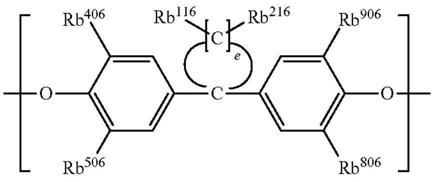

Formula (B7)

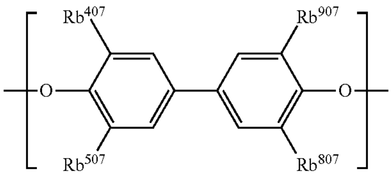

Formula (B8)

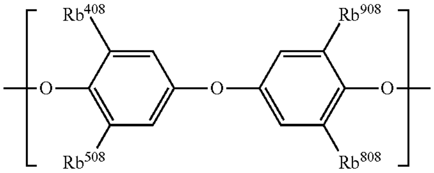

in Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B7), $Rb^{407}$, $Rb^{507}$, $Rb^{807}$, and $Rb^{907}$ each independently represent a 16 hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

12. A process cartridge comprising:

the electrophotographic photoreceptor according to claim 1, wherein the process cartridge is attachable to and detachable from an image forming apparatus.

13. A process cartridge comprising:

the electrophotographic photoreceptor according to claim 6, wherein the process cartridge is attachable to and detachable from an image forming apparatus.

14. An image forming apparatus comprising:

the electrophotographic photoreceptor according to claim 1;

a charging unit that charges a surface of the electrophotographic photoreceptor;

an electrostatic latent image forming unit that forms an electrostatic latent image on the surface of the charged electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

15. An image forming apparatus comprising:

the electrophotographic photoreceptor according to claim 6;

a charging unit that charges a surface of the electrophotographic photoreceptor;

an electrostatic latent image forming unit that forms an electrostatic latent image on the surface of the charged electrophotographic photoreceptor;

a developing unit that develops the electrostatic latent image formed on the surface of the electrophotographic photoreceptor with a developer containing a toner to form a toner image; and a transfer unit that transfers the toner image to a surface of a recording medium.

16. An electrophotographic photoreceptor comprising:

a conductive substrate; and a lamination type photosensitive layer disposed on the conductive substrate and including a charge generation layer and a charge transport layer, wherein the charge transport layer contains a charge transport material and a polyester resin, and wherein the polyester resin is a polyester resin (1) having a dicarboxylic acid unit (A) represented by Formula (A) and a diol unit (B) represented by Formula (B), Formula (A)

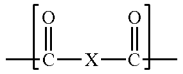

Formula (B)

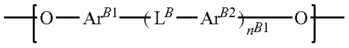

in Formula (A), X represents an organic group, in Formula (B), $Ar^{B1}$ and $Ar^{B2}$ each independently represent an aromatic ring that may have a substituent, $L^B$ represents a single bond, an oxygen atom, a sulfur atom, or —$C(Rb^1)(Rb^2)$—, and $n^{B1}$ represents 0, 1, or 2, and $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group, wherein the dicarboxylic acid unit (A) is at least one selected from the group consisting of a dicarboxylic acid unit (A1) represented by Formula (A1), a dicarboxylic acid unit (A2) represented by Formula (A2), and a dicarboxylic acid unit (A4) represented Formula (A4)

Formula (A1)

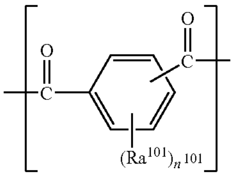

(Formula A2)

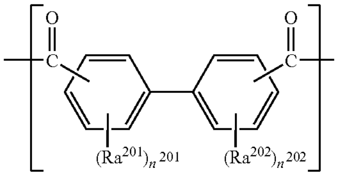

(Formula A4)

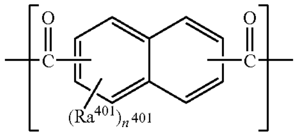

in Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms, and a mass proportion of a chemical substance (AA) represented by Formula (AA) in a total mass of the charge transport layer is 80 ppm or more and 2,000 ppm or less, Formula (AA)

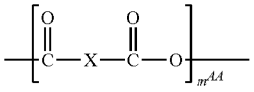

in Formula (AA), X represents an organic group, and $m^{AA}$ represents an integer, wherein the chemical substance (AA) has at least one selected from the group consisting of a repeating unit (AA1) represented by Formula (AA1), a repeating unit (AA2) represented by Formula (AA2), and a repeating unit (AA4) represented Formula (AA4), Formula (AA1)

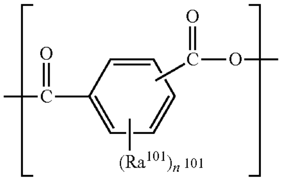

-continued

Formula (AA2)

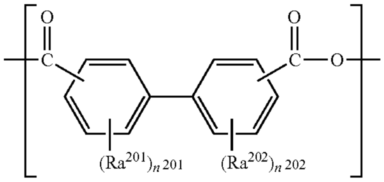

Formula (AA4)

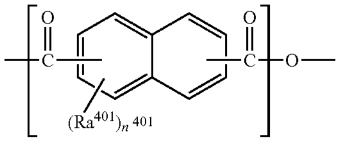

, in Formula (AA1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (AA2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (AA4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

* * * * *